(12) United States Patent
Schneider et al.

(10) Patent No.: US 8,540,276 B2
(45) Date of Patent: Sep. 24, 2013

(54) INFLATABLE KNEE AIRBAG ASSEMBLIES WITH CUSHION FOLD PATTERN

(75) Inventors: David W. Schneider, Waterford, MI (US); John F. Whitt, Jr., Clinton Township, MI (US)

(73) Assignee: Autoliv ASP, Inc., Ogden, UT (US)

( * ) Notice: Subject to any disclaimer, the term of this patent is extended or adjusted under 35 U.S.C. 154(b) by 72 days.

(21) Appl. No.: 13/290,856

(22) Filed: Nov. 7, 2011

(65) Prior Publication Data

US 2013/0113190 A1 May 9, 2013

(51) Int. Cl.
*B60R 21/206* (2011.01)

(52) U.S. Cl.
USPC ............... 280/730.1; 280/743.1; 280/732

(58) Field of Classification Search
USPC .............. 280/743.1, 728.2, 730.1, 732, 730.2
See application file for complete search history.

(56) References Cited

U.S. PATENT DOCUMENTS

| | | |
|---|---|---|
| 3,748,477 A | 7/1973 | Wulbrecht |
| 3,858,822 A | 1/1975 | Wood |
| 3,904,222 A | 9/1975 | Bursott et al. |
| 3,966,227 A | 6/1976 | Cameron |
| 4,181,325 A | 1/1980 | Barnett |
| 4,235,453 A | 11/1980 | Lawson et al. |
| 4,286,954 A | 9/1981 | McArthur et al. |
| 4,290,627 A | 9/1981 | Cumming et al. |
| 4,351,544 A | 9/1982 | Ross |
| 4,842,300 A | 6/1989 | Ziomek et al. |
| 5,004,266 A | 4/1991 | Miller et al. |
| 5,022,675 A | 6/1991 | Zelenak et al. |
| 5,140,799 A | 8/1992 | Satoh |
| 5,162,035 A | 11/1992 | Baker |
| 5,178,407 A | 1/1993 | Kelley |
| 5,240,282 A | 8/1993 | Wehner et al. |
| 5,246,250 A | 9/1993 | Wolanin et al. |
| 5,290,061 A | 3/1994 | Bollaert |
| 5,310,216 A | 5/1994 | Wehner et al. |
| 5,338,061 A | 8/1994 | Nelson et al. |
| 5,344,184 A | 9/1994 | Keeler et al. |
| 5,346,248 A | 9/1994 | Rhein et al. |
| 5,391,137 A | 2/1995 | DePoy et al. |
| 5,398,968 A | 3/1995 | Emambakhsh et al. |
| 5,407,227 A | 4/1995 | Lauritzen et al. |
| 5,419,579 A | 5/1995 | McPherson et al. |

(Continued)

FOREIGN PATENT DOCUMENTS

| | | |
|---|---|---|
| DE | 20 2006 014 012 | 8/2006 |
| DE | 10 2008 029 810 | 12/2009 |

(Continued)

OTHER PUBLICATIONS

International Search Report of the International Searching Authority mailed Feb. 7, 2013 in International Application No. PCT/US2012/63324.*

(Continued)

*Primary Examiner* — Ruth Ilan
(74) *Attorney, Agent, or Firm* — Stoel Rives LLP

(57) ABSTRACT

An airbag assembly can include a housing and an airbag cushion within the housing in a packaged state. The airbag cushion can include a rolled region and an accordion fold. The rolled region and the accordion fold can be positioned within the housing so as to provide a desired trajectory when the airbag cushion is inflated.

24 Claims, 21 Drawing Sheets

(56) References Cited

U.S. PATENT DOCUMENTS

| | | | |
|---|---|---|---|
| 5,425,551 A | 6/1995 | Hawthorn | |
| 5,427,410 A | 6/1995 | Shiota et al. | |
| 5,447,329 A | 9/1995 | Hamada | |
| 5,452,913 A | 9/1995 | Hansen | |
| 5,454,595 A | 10/1995 | Olson et al. | |
| 5,460,400 A | 10/1995 | Davidson | |
| 5,492,363 A | 2/1996 | Hartmeyer et al. | |
| 5,492,367 A | 2/1996 | Albright et al. | |
| 5,493,846 A | 2/1996 | Baker et al. | |
| 5,496,056 A | 3/1996 | Dyer | |
| 5,529,337 A | 6/1996 | Takeda et al. | |
| 5,531,477 A | 7/1996 | Madrigal et al. | |
| 5,538,281 A | 7/1996 | Patercsak | |
| 5,570,905 A | 11/1996 | Dyer | |
| 5,588,674 A | 12/1996 | Yoshimura et al. | |
| 5,613,698 A | 3/1997 | Patercsak et al. | |
| 5,630,614 A | 5/1997 | Conlee | |
| 5,630,621 A | 5/1997 | Schneider | |
| 5,669,204 A | 9/1997 | Blaisdell | |
| 5,669,627 A | 9/1997 | Marjanski et al. | |
| 5,690,354 A | 11/1997 | Logan et al. | |
| 5,694,737 A | 12/1997 | Lunt et al. | |
| 5,730,463 A * | 3/1998 | Fisher et al. | 280/743.1 |
| 5,732,973 A | 3/1998 | Turnbull et al. | |
| 5,755,078 A | 5/1998 | Hurtig et al. | |
| 5,755,459 A | 5/1998 | LaLonde | |
| 5,765,867 A | 6/1998 | French | |
| 5,772,239 A | 6/1998 | Seymour | |
| 5,803,487 A | 9/1998 | Kikuchi et al. | |
| 5,810,390 A | 9/1998 | Enders et al. | |
| 5,823,566 A | 10/1998 | Manire | |
| 5,823,567 A | 10/1998 | Behr et al. | |
| 5,839,755 A | 11/1998 | Turnbull | |
| 5,845,935 A | 12/1998 | Enders et al. | |
| 5,899,495 A | 5/1999 | Yamamoto et al. | |
| 5,927,748 A | 7/1999 | O'Driscoll | |
| 5,957,486 A | 9/1999 | Taguchi et al. | |
| 5,979,937 A | 11/1999 | Yoshida et al. | |
| 6,010,147 A | 1/2000 | Brown | |
| 6,017,057 A | 1/2000 | O'Docherty | |
| 6,029,996 A | 2/2000 | Yoshioka et al. | |
| 6,056,318 A | 5/2000 | Braunschadel | |
| 6,059,312 A | 5/2000 | Staub et al. | |
| 6,110,094 A | 8/2000 | Wallentin et al. | |
| 6,131,944 A | 10/2000 | Henkel et al. | |
| 6,135,495 A | 10/2000 | Redgrave et al. | |
| 6,142,517 A | 11/2000 | Nakamura et al. | |
| 6,155,595 A | 12/2000 | Schultz | |
| 6,155,598 A | 12/2000 | Kutchey | |
| 6,186,544 B1 | 2/2001 | Igawa | |
| 6,196,585 B1 | 3/2001 | Igawa | |
| 6,203,062 B1 | 3/2001 | Kusaka et al. | |
| 6,213,496 B1 | 4/2001 | Minami et al. | |
| 6,217,059 B1 | 4/2001 | Brown et al. | |
| 6,224,129 B1 | 5/2001 | Cisternino et al. | |
| 6,254,121 B1 | 7/2001 | Fowler et al. | |
| 6,286,866 B1 | 9/2001 | Satge et al. | |
| 6,299,202 B1 | 10/2001 | Okada et al. | |
| 6,299,205 B1 | 10/2001 | Keshavaraj | |
| 6,352,283 B1 | 3/2002 | Ellerbrok et al. | |
| 6,364,348 B1 | 4/2002 | Jang et al. | |
| 6,371,510 B1 | 4/2002 | Marriott et al. | |
| 6,390,500 B1 | 5/2002 | Yamada et al. | |
| 6,398,258 B2 | 6/2002 | Hamada et al. | |
| 6,431,583 B1 | 8/2002 | Schneider | |
| 6,432,033 B1 | 8/2002 | Salzmann et al. | |
| 6,454,296 B1 | 9/2002 | Tesch et al. | |
| 6,464,255 B1 | 10/2002 | Preisler et al. | |
| 6,474,686 B1 | 11/2002 | Higuchi et al. | |
| 6,494,484 B2 | 12/2002 | Bosgieter et al. | |
| 6,499,765 B2 | 12/2002 | Hawthorn et al. | |
| 6,557,891 B2 | 5/2003 | Okada et al. | |
| 6,558,793 B2 | 7/2003 | Rose | |
| 6,619,691 B1 | 9/2003 | Igawa | |
| 6,631,920 B1 | 10/2003 | Webber et al. | |
| 6,655,711 B1 | 12/2003 | Labrie et al. | |
| 6,669,229 B2 | 12/2003 | Thomas | |
| 6,682,093 B2 | 1/2004 | Tajima et al. | |
| 6,685,217 B2 | 2/2004 | Abe | |
| 6,692,024 B2 | 2/2004 | Fischer et al. | |
| 6,715,789 B2 | 4/2004 | Takimoto et al. | |
| 6,739,622 B2 | 5/2004 | Halford et al. | |
| 6,752,417 B2 | 6/2004 | Takimoto et al. | |
| 6,767,030 B2 | 7/2004 | Yamaji et al. | |
| 6,830,266 B2 | 12/2004 | Abe | |
| 6,832,779 B2 | 12/2004 | Tajima et al. | |
| 6,846,005 B2 | 1/2005 | Ford et al. | |
| 6,874,810 B2 | 4/2005 | Soderquist | |
| 6,877,765 B2 | 4/2005 | Rose et al. | |
| 6,877,772 B2 | 4/2005 | Fischer et al. | |
| 6,883,381 B2 | 4/2005 | Kolb et al. | |
| 6,883,831 B2 | 4/2005 | Hawthorn et al. | |
| 6,913,280 B2 | 7/2005 | Dominissini et al. | |
| 6,942,242 B2 | 9/2005 | Hawthorn et al. | |
| 6,945,557 B2 | 9/2005 | Takimoto et al. | |
| 6,945,562 B2 | 9/2005 | Abe | |
| 6,955,377 B2 | 10/2005 | Cooper et al. | |
| 6,959,944 B2 | 11/2005 | Mori et al. | |
| 6,962,363 B2 | 11/2005 | Wang et al. | |
| 6,962,366 B2 | 11/2005 | Fukuda et al. | |
| 6,971,671 B2 | 12/2005 | Schneider et al. | |
| 6,988,743 B2 | 1/2006 | Okamoto et al. | |
| 7,000,945 B2 | 2/2006 | Bakhsh et al. | |
| 7,000,947 B2 | 2/2006 | Kumagai et al. | |
| 7,029,026 B2 | 4/2006 | Morita | |
| 7,055,851 B2 | 6/2006 | Takimoto et al. | |
| 7,083,191 B2 | 8/2006 | Fischer | |
| 7,090,245 B2 * | 8/2006 | Yoshikawa et al. | 280/729 |
| 7,131,664 B1 | 11/2006 | Pang et al. | |
| 7,147,247 B2 | 12/2006 | Hayakawa | |
| 7,150,470 B2 | 12/2006 | Okada et al. | |
| 7,156,418 B2 | 1/2007 | Sato et al. | |
| 7,175,195 B2 | 2/2007 | Morita | |
| 7,182,365 B2 | 2/2007 | Takimoto et al. | |
| 7,185,912 B2 | 3/2007 | Matsuura et al. | |
| 7,195,275 B2 | 3/2007 | Abe | |
| 7,195,280 B2 | 3/2007 | Wheelwright et al. | |
| 7,201,396 B2 | 4/2007 | Takimoto et al. | |
| 7,223,224 B2 | 5/2007 | Card et al. | |
| 7,226,077 B2 | 6/2007 | Abe | |
| 7,232,149 B2 | 6/2007 | Hotta et al. | |
| 7,232,153 B2 | 6/2007 | Kawauchimaru et al. | |
| 7,237,802 B2 | 7/2007 | Rose et al. | |
| 7,261,318 B2 | 8/2007 | Enders | |
| 7,281,734 B2 | 10/2007 | Abe et al. | |
| 7,293,795 B2 | 11/2007 | Kong | |
| 7,314,228 B2 | 1/2008 | Ishiguro et al. | |
| 7,314,230 B2 | 1/2008 | Kumagai et al. | |
| 7,347,444 B2 | 3/2008 | Wheelwright | |
| 7,347,450 B2 | 3/2008 | Williams et al. | |
| 7,370,881 B2 | 5/2008 | Takimoto et al. | |
| 7,374,201 B2 | 5/2008 | Chausset | |
| 7,374,202 B2 | 5/2008 | Lim | |
| 7,380,813 B2 | 6/2008 | Lanzinger et al. | |
| 7,384,065 B2 | 6/2008 | Takimoto et al. | |
| 7,387,311 B2 | 6/2008 | Kanno et al. | |
| 7,396,044 B2 | 7/2008 | Bauer et al. | |
| 7,404,570 B2 | 7/2008 | Miyata | |
| 7,434,837 B2 | 10/2008 | Hotta et al. | |
| 7,438,310 B2 | 10/2008 | Takimoto et al. | |
| 7,441,804 B2 | 10/2008 | Rose et al. | |
| 7,441,805 B2 | 10/2008 | Jamison et al. | |
| 7,445,239 B2 | 11/2008 | Okada et al. | |
| 7,481,455 B2 | 1/2009 | Iida et al. | |
| 7,487,994 B2 | 2/2009 | Okada et al. | |
| 7,530,597 B2 | 5/2009 | Bito | |
| 7,549,672 B2 | 6/2009 | Sato et al. | |
| 7,566,074 B2 | 7/2009 | Hawthorn et al. | |
| 7,568,724 B2 | 8/2009 | Kutchey et al. | |
| 7,568,730 B2 | 8/2009 | Kwon | |
| 7,600,782 B2 | 10/2009 | Ishiguro et al. | |
| 7,607,690 B2 | 10/2009 | Abe et al. | |
| 7,631,894 B2 | 12/2009 | Hasebe et al. | |
| 7,641,223 B2 | 1/2010 | Knowlden | |

| | | |
|---|---|---|
| 7,651,130 B2 | 1/2010 | Bauberger |
| 7,658,408 B2 | 2/2010 | Zofchak et al. |
| 7,658,409 B2 | 2/2010 | Ford et al. |
| 7,695,013 B2 | 4/2010 | Kakstis et al. |
| 7,712,769 B2 | 5/2010 | Hasebe et al. |
| 7,717,460 B2 | 5/2010 | Franke et al. |
| 7,726,685 B2 | 6/2010 | Abe et al. |
| 7,735,862 B2 | 6/2010 | Choi |
| 7,744,118 B2 | 6/2010 | Takimoto et al. |
| 7,748,739 B2 | 7/2010 | Brinker |
| 7,753,405 B2 | 7/2010 | Ishiguro et al. |
| 7,753,407 B2 | 7/2010 | Yokota |
| 7,766,374 B2 | 8/2010 | Abele et al. |
| 7,770,925 B2 | 8/2010 | Seymour et al. |
| 7,770,926 B2 | 8/2010 | Schneider et al. |
| 7,793,973 B2 | 9/2010 | Sato et al. |
| 7,798,517 B2 | 9/2010 | Ishida |
| 7,819,419 B2 | 10/2010 | Hayashi et al. |
| 7,819,420 B2 * | 10/2010 | Adachi et al. ............... 280/730.1 |
| 7,845,682 B2 | 12/2010 | Lachat et al. |
| 7,857,347 B2 | 12/2010 | Abe et al. |
| 7,878,538 B2 | 2/2011 | Abe et al. |
| 7,878,540 B2 | 2/2011 | Takimoto et al. |
| 7,926,844 B2 | 4/2011 | Williams |
| 7,931,297 B2 | 4/2011 | Abe et al. |
| 7,938,444 B2 | 5/2011 | Williams et al. |
| 7,942,442 B2 | 5/2011 | Rose et al. |
| 7,959,184 B2 | 6/2011 | Fukawatase et al. |
| 8,047,570 B2 | 11/2011 | Feller |
| 8,070,183 B2 | 12/2011 | Kumagai et al. |
| 8,083,254 B2 | 12/2011 | Enders et al. |
| 8,118,325 B2 | 2/2012 | Enders et al. |
| 8,226,118 B2 | 7/2012 | Rose et al. |
| 8,272,667 B2 | 9/2012 | Schneider et al. |
| 8,297,649 B2 | 10/2012 | Enders |
| 8,297,650 B2 | 10/2012 | Enders |
| 8,360,464 B2 | 1/2013 | Enders |
| 8,407,968 B2 | 4/2013 | Lachat et al. |
| 2001/0007391 A1 | 7/2001 | Hamada et al. |
| 2002/0020990 A1 | 2/2002 | Sinnhuber et al. |
| 2002/0044819 A1 | 4/2002 | Shamoon |
| 2002/0149187 A1 | 10/2002 | Holtz et al. |
| 2002/0171231 A1 | 11/2002 | Takimoto et al. |
| 2002/0180187 A1 | 12/2002 | Hayashi |
| 2003/0001366 A1 | 1/2003 | Debler et al. |
| 2003/0034637 A1 | 2/2003 | Wang et al. |
| 2003/0189319 A1 | 10/2003 | Soderquist |
| 2003/0209888 A1 | 11/2003 | Davis, Jr. et al. |
| 2003/0234520 A1 | 12/2003 | Hawthorn et al. |
| 2004/0251669 A1 | 12/2004 | Fischer et al. |
| 2005/0001412 A1 | 1/2005 | Schneider et al. |
| 2005/0057028 A1 | 3/2005 | Hayakawa |
| 2005/0062265 A1 | 3/2005 | Hotta et al. |
| 2005/0070414 A1 * | 3/2005 | Schneider et al. ............ 493/405 |
| 2005/0134032 A1 | 6/2005 | Downing et al. |
| 2005/0151351 A1 | 7/2005 | Enders et al. |
| 2005/0194767 A1 | 9/2005 | Freisler et al. |
| 2005/0194771 A1 | 9/2005 | Clark et al. |
| 2005/0212275 A1 | 9/2005 | Hasebe |
| 2005/0230939 A1 | 10/2005 | Abe et al. |
| 2005/0242551 A1 * | 11/2005 | Noguchi et al. ........... 280/730.2 |
| 2006/0012157 A1 | 1/2006 | Ishiguro et al. |
| 2006/0131847 A1 | 6/2006 | Sato et al. |
| 2006/0192370 A1 | 8/2006 | Abe et al. |
| 2006/0244248 A1 | 11/2006 | Rose et al. |
| 2006/0279073 A1 | 12/2006 | Hotta et al. |
| 2007/0052221 A1 | 3/2007 | Okada et al. |
| 2007/0057487 A1 | 3/2007 | Kim |
| 2007/0120346 A1 | 5/2007 | Kwon |
| 2007/0126219 A1 | 6/2007 | Williams |
| 2007/0138779 A1 | 6/2007 | Kwon |
| 2007/0170710 A1 | 7/2007 | Bouquier |
| 2007/0200321 A1 | 8/2007 | Heitplatz et al. |
| 2007/0246920 A1 | 10/2007 | Abele et al. |
| 2007/0267852 A1 | 11/2007 | Enders |
| 2007/0278772 A1 | 12/2007 | Burghardt et al. |
| 2008/0023950 A1 | 1/2008 | Kalczynski et al. |
| 2008/0048418 A1 | 2/2008 | Remley et al. |
| 2008/0157509 A1 | 7/2008 | Abe et al. |
| 2008/0203713 A1 | 8/2008 | McFadden et al. |
| 2008/0217887 A1 | 9/2008 | Seymour et al. |
| 2008/0217892 A1 | 9/2008 | Maripudi et al. |
| 2008/0238048 A1 | 10/2008 | Ishida |
| 2008/0284140 A1 | 11/2008 | Choi |
| 2009/0039630 A1 | 2/2009 | Schneider et al. |
| 2009/0045607 A1 | 2/2009 | Fukuyama et al. |
| 2009/0058048 A1 | 3/2009 | Shida et al. |
| 2009/0058052 A1 | 3/2009 | Ford et al. |
| 2009/0085333 A1 | 4/2009 | Imaeda et al. |
| 2009/0102173 A1 | 4/2009 | Rose et al. |
| 2009/0108574 A1 | 4/2009 | Lachat et al. |
| 2009/0134611 A1 | 5/2009 | Wigger et al. |
| 2009/0146400 A1 | 6/2009 | Knowlden |
| 2009/0152842 A1 | 6/2009 | Benny et al. |
| 2009/0152847 A1 | 6/2009 | Hong et al. |
| 2009/0184498 A1 | 7/2009 | Takimoto et al. |
| 2009/0212541 A1 | 8/2009 | Wallat et al. |
| 2009/0242308 A1 | 10/2009 | Kitte et al. |
| 2009/0256340 A1 | 10/2009 | Williams et al. |
| 2010/0025973 A1 | 2/2010 | Jang et al. |
| 2010/0090445 A1 | 4/2010 | Williams et al. |
| 2010/0270775 A1 | 10/2010 | Enders et al. |
| 2010/0270779 A1 | 10/2010 | Enders et al. |
| 2010/0270782 A1 | 10/2010 | Enders et al. |
| 2011/0012327 A1 | 1/2011 | Enders |
| 2011/0031725 A1 | 2/2011 | Rose et al. |
| 2011/0088356 A1 | 4/2011 | Lachat et al. |
| 2011/0095512 A1 * | 4/2011 | Mendez .................... 280/730.1 |
| 2011/0101660 A1 | 5/2011 | Schneider et al. |
| 2011/0148077 A1 | 6/2011 | Enders |
| 2012/0025496 A1 | 2/2012 | Schneider et al. |
| 2012/0049488 A1 | 3/2012 | Enders |
| 2012/0049497 A1 | 3/2012 | Enders |
| 2012/0242066 A1 * | 9/2012 | Chavez et al. ............. 280/730.2 |
| 2012/0280477 A1 | 11/2012 | Young et al. |

FOREIGN PATENT DOCUMENTS

| | | |
|---|---|---|
| JP | 06255437 A | 9/1994 |
| JP | 2005 343267 | 12/2005 |
| WO | WO 02/04262 | 1/2002 |
| WO | WO 2008/109202 | 9/2008 |
| WO | WO 2010/126623 | 11/2010 |
| WO | WO 2011/008916 | 1/2011 |
| WO | WO 2011/056810 | 5/2011 |
| WO | WO 2011/079178 | 6/2011 |
| WO | WO-2012/030482 | 3/2012 |

OTHER PUBLICATIONS

Written Opinion of the International Searching Authority mailed Feb. 7, 2013 in International Application No. PCT/US2012/63324.*

Amendment and Response to Office Action filed Aug. 17, 2012 in co-pending U.S. Appl. No. 12/580,488, now published as U.S. Publication No. US 2011/0088356.

Restriction and/or Election Requirement mailed Jan. 20, 2011 in co-pending U.S. Appl. No. 12/430,562, now published as U.S. Publication No. US 2010/0270775.

Amendment and Response to Requirement of Election of Species filed Feb. 22, 2011 in co-pending U.S. Appl. No. 12/430,562, now published as U.S. Publication No. US 2010/0270775.

Office Action mailed Mar. 30, 2011 in co-pending U.S. Appl. No. 12/430,562, now published as U.S. Publication No. US 2010/0270775.

Amendment and Response to Office Action filed Jun. 30, 2011 in co-pending U.S. Appl. No. 12/430,562, now published as U.S. Publication No. US 2010/0270775.

Examiner's Interview Summary mailed Jul. 6, 2011 in co-pending U.S. Appl. No. 12/430,562, now published as U.S. Publication No. US 2010/0270775.

Notice of Allowance and Fee(s) Due mailed Aug. 23, 2011 in co-pending U.S. Appl. No. 12/430,562, now published as U.S. Publication No. US 2010/0270775.

Office Action mailed Jan. 21, 2011 in co-pending U.S. Appl. No. 12/430,274, now published as U.S. Publication No. US 2010/0270779.

Amendment and Response to Office Action filed Jul. 21, 2011 in co-pending U.S. Appl. No. 12/430,274, now published as U.S. Publication No. US 2010/0270779.
Notice of Allowance and Fee(s) Due mailed Oct. 18, 2011 in co-pending U.S. Appl. No. 12/430,274, now published as U.S. Publication No. US 2010/0270779.
Restriction Requirement mailed Sep. 15, 2010 in co-pending U.S. Appl. No. 12/430,246, now published as U.S. Publication No. US 2010/0270782.
Amendment and Response to Requirement for Election of Species filed Oct. 12, 2010 in co-pending U.S. Appl. No. 12/430,246, now published as U.S. Publication No. US 2010/0270782.
Office Action mailed Oct. 29, 2010 in co-pending U.S. Appl. No. 12/430,246, now published as U.S. Publication No. US 2010/0270782.
Amendment and Response to Office Action filed Apr. 28, 2011 in co-pending U.S. Appl. No. 12/430,246, now published as U.S. Publication No. US 2010/0270782.
Final Office Action mailed Jun. 24, 2011 in co-pending U.S. Appl. No. 12/430,246, now published as U.S. Publication No. US 2010/0270782.
Preliminary Amendment filed Aug. 31, 2009 in co-pending U.S. Appl. No. 12/504,544, now published as U.S. Publication No. US 2011/0012327.
Preliminary Amendment filed Jul. 15, 2010 in co-pending U.S. Appl. No. 12/504,544, now published as U.S. Publication No. US 2011/0012327.
Office Action mailed Dec. 13, 2010 in co-pending U.S. Appl. No. 12/504,544, now published as U.S. Publication No. US 2011/0012327.
Amendment and Response to Office Action filed Jun. 13, 2011 in co-pending U.S. Appl. No. 12/504,544, now published as U.S. Publication No. US 2011/0012327.
Final Office Action mailed Jun. 29, 2011 in co-pending U.S. Appl. No. 12/504,544, now published as U.S. Publication No. US 2011/0012327.
Examiner's Interview Summary mailed Jul. 7, 2011 in co-pending U.S. Appl. No. 12/504,544, now published as U.S. Publication No. US 2011/0012327.
Amendment and Response After Final filed Aug. 29, 2011 in co-pending U.S. Appl. No. 12/504,544, now published as U.S. Publication No. US 2011/0012327.
Advisory Action mailed Sep. 9, 2011 in co-pending U.S. Appl. No. 12/504,544, now published as U.S. Publication No. US 2011/0012327.
Request for Continued Examination filed Oct. 6, 2011 in co-pending U.S. Patent Application No. 12/504,544, now published as U.S. Publication No. US 2011/0012327.
Office Action mailed Dec. 1, 2011 in co-pending U.S. Appl. No. 12/504,544, now published as U.S. Publication No. US 2011/0012327.
Restriction Requirement mailed Dec. 14, 2011 in co-pending U.S. Appl. No. 12/611,676, now published as U.S. Publication No. US 2011/0101660.
Restriction Requirement mailed Oct. 27, 2011 in co-pending U.S. Appl. No. 12/872,946.
Amendment and Response to Requirement of Election of Species filed Nov. 28, 2011 in co-pending U.S. Appl. No. 12/872,946.
Office Action mailed Dec. 14, 2011 in co-pending U.S. Appl. No. 12/872,946.
Notification of Transmittal of the International Search Report and the Written Opinion of the International Searching Authority mailed Mar. 30, 2010 in International Application No. PCT/US2010/021343.
Notification of Transmittal of the International Search Report and the Written Opinion of the International Searching Authority mailed Feb. 18, 2011 in International Application No. PCT/US2010/061744.
Notification of Transmittal of the International Search Report and the Written Opinion of the International Searching Authority mailed Sep. 23, 2010 in International Application No. PCT/US2010/042070.
Notification of Transmittal of the International Search Report and the Written Opinion of the International Searching Authority mailed Jan. 3, 2011 in International Application No. PCT/US2010/055197.
Co-pending U.S. Appl. No. 13/270,462, titled Knee Airbag Assemblies and Related Methods, filed Oct. 11, 2011.
Applicant-Initiated Interview Summary mailed Dec. 18, 2012 in co-pending U.S. Appl. No. 12/645,130, now published as U.S. Publication No. US 2011/0148077.
Amendment and Response filed Dec. 19, 2012 in co-pending U.S. Appl. No. 12/645,130, now published as U.S. Publication No. US 2011/0148077.
Notice of Allowance and Fee(s) Due mailed Oct. 4, 2012 in co-pending U.S. Appl. No. 12/872,323, now published as U.S. Publication No. US 2012/0049488.
Office Action mailed Nov. 6, 2012 in co-pending U.S. Appl. No. 13/270,462, now published as U.S. Publication No. US 2012/0025496.
Notice of Allowance and Fee(s) Due mailed Mar. 28, 2012 in co-pending U.S. Appl. No. 12/536,360, now published as U.S. Publication No. US 2011/0031725.
Office Action mailed Feb. 17, 2012 in co-pending U.S. Appl. No. 12/580,488, now published as U.S. Publication No. US 2011/0088356.
Non-Final Office Action mailed Mar. 8, 2012 in co-pending U.S. Appl. No. 12/611,676, now published as U.S. Publication No. US 2011/0101660.
Non-Final Office Action mailed Mar. 12, 2012 in co-pending U.S. Appl. No. 12/872,323, now published as U.S. Publication No. US 2012/0049488.
Office Action mailed Apr. 9, 2007 in co-pending U.S. Appl. No. 11/115,928, now U.S. Patent No. 7,441,804.
Amendment and Response to Office Action filed Jul. 23, 2007 in co-pending U.S. Appl. No. 11/115,928, now U.S. Patent No. 7,441,804.
Office Action mailed Oct. 17, 2007 in co-pending U.S. Appl. No. 11/115,928, now U.S. Patent No. 7,441,804.
Amendment and Response to Office Action filed Feb. 5, 2008 in co-pending U.S. Appl. No. 11/115,928, now U.S. Patent No. 7,441,804.
Office Action mailed Feb. 27, 2008 in co-pending U.S. Appl. No. 11/115,928, now U.S. Patent No. 7,441,804.
Amendment and Response to Office Action filed May 5, 2008 in co-pending U.S. Appl. No. 11/115,928, now U.S. Patent No. 7,441,804.
Notice of Allowance mailed Aug. 26, 2008 in co-pending U.S. Appl. No. 11/115,928, now U.S. Patent No. 7,441,804.
Office Action mailed Jun. 19, 2009 in co-pending U.S. Appl. No. 11/804,146, now U.S. Patent No. 7,735,862.
Amendment and Response to Office Action issued Jun. 19, 2009 in co-pending U.S. Appl. No. 11/804,146, now U.S. Patent No. 7,735,862.
Notice of Allowance and Fee(s) Due mailed Feb. 25, 2010 in co-pending U.S. Appl. No. 11/804,146, now U.S. Patent No. 7,735,862.
Examiner's Amendment mailed May 10, 2010 in co-pending U.S. Appl. No. 11/804,146, now U.S. Patent No. 7,735,862.
Restriction Requirement mailed Feb. 5, 2010 in in co-pending U.S. Appl. No. 12/100,465, now published as U.S. Publication No. US-2009-0256340.
Amendment and Response to Requirement for Election of Invention and Election of Species filed Apr. 5, 2010 in co-pending U.S. Appl. No. 12/100,465, now issued as US Patent No. 7,926,844.
Office Action mailed May 19, 2010 in co-pending U.S. Appl. No. 12/100,465 now issued as US Patent No. 7,926,844.
Amendment and Response to Office Action filed Nov. 19, 2010 in co-pending U.S. Appl. No. 12/100,465, now issued as US Patent No. 7,926,844.
Notice of Allowance and Fee(s) Due mailed Dec. 15, 2010 in co-pending U.S. Appl. No. 12/100,465, now issued as US Patent No. 7,926,844.
Office Action mailed Jun. 9, 2010 in co-pending U.S. Appl. No. 12/259,221, now issued as US Patent No. 7,942,442.

Response to Office Action and Terminal Disclaimer filed Sep. 9, 2010 in co-pending U.S. Appl. No. 12/259,221, now issued as US Patent No. 7,942,442.
Terminal Disclaimer Review Decision mailed Oct. 6, 2010 in in co-pending U.S. Appl. No. 12/259,221, now issued as US Patent No. 7,942,442.
Restriction Requirement mailed Nov. 22, 2010 in co-pending U.S. Appl. No. 12/259,221, now issued as US Patent No. 7,942,442.
Amendment and Response to Requirement of Election of Species filed Dec. 22, 2010 in co-pending U.S. Appl. No. 12/259,221, now issued as US Patent No. 7,942,442.
Notice of Allowance mailed Apr. 1, 2011 in co-pending U.S. Appl. No. 12/259,221, now issued as US Patent No. 7,942,442.
Notice of Allowance mailed Jun. 23, 2010 in co-pending U.S. Appl. No. 12/349,341, now issued as US Patent No. 7,845,682.
Request for Continued Examination filed Jul. 16, 2010 in co-pending U.S. Appl. No. 12/349,341, now issued as US Patent No. 7,845,682.
Notice of Allowance mailed Aug. 12, 2010 in co-pending U.S. Appl. No. 12/349,341, now issued as US Patent No. 7,845,682.
Restriction Requirement mailed Oct. 27, 2011 in co-pending U.S. Appl. No. 12/536,360, now published as U.S. Publication No. US 2011/0031725.
Amendment and Response to Requirement of Election of Species filed Nov. 17, 2011 in co-pending U.S. Appl. No. 12/536,360, now published as U.S. Publication No. US 2011/0031725.
Restriction Requirement mailed Jan. 20, 2012 in co-pending U.S. Appl. No. 12/645,130, now published as U.S. Publication No. US 2011/0148077.
Amendment and Responses to Restriction Requirement filed Jan. 17, 2012 in co-pending U.S. Appl. No. 12/611,676, now published as U.S. Publication No. US 2011/0101660.
Notification of Transmittal of the International Search Report and the Written Opinion of the International Searching Authority mailed Jan. 26, 2012 in International Application No. PCT/US2011/046952.
Notice of Allowance and Fee(s) Due mailed Dec. 10, 2012 in co-pending U.S. Appl. No. 12/580,488, now published as U.S. Publication No. US 2011/0088356.
Office Action mailed Oct. 11, 2012 in co-pending U.S. Appl. No. 13/553,521, now published as U.S. Publication No. US 2012/0280477.
Amendment and Response to Restriction Requirement filed Jun. 20, 2012 in co-pending U.S. Appl. No. 12/645,130, now published as U.S. Publication No. US 2011/0148077.
Office Action mailed Jul. 19, 2012 in co-pending U.S. Appl. No. 12/645,130, now published as U.S. Publication No. US 2011/0148077.
Amendment and Response to Office Action filed May 29, 2012 in co-pending U.S. Appl. No. 12/504,544, now published as U.S. Publication No. US 2011/0012327.
Notice of Allowance and Fee(s) Due mailed Jun. 28, 2012 in co-pending U.S. Appl. No. 12/504,544, now published as U.S. Publication No. US 2011/0012327.
Amendment and Response to Office Action filed Jun. 8, 2012 in co-pending U.S. Appl. No. 12/611,676, now published as U.S. Publication No. US 2011/0101660.
Notice of Allowance and Fee(s) Due mailed Jun. 19, 2012 in co-pending U.S. Appl. No. 12/611,676, now published as U.S. Publication No. US 2011/0101660.
Amendment and Response to Office Action filed Sep. 12, 2012 in co-pending U.S. Appl. No. 12/872,323, now published as U.S. Publication No. US 2012/0049488.
Amendment and Response to Office Action filed Jun. 14, 2012 in co-pending U.S. Appl. No. 12/872,946, now published as U.S. Publication No. US 2012/0049497.
Notice of Allowance and Fee(s) Due mailed Jun. 28, 2012 in co-pending U.S. Appl. No. 12/872,946, now published as U.S. Publication No. US 2012/0049497.
Amendment and Response to Office Action filed Apr. 11, 2013 in co-pending U.S. Appl. No. 13/553,521, now published as U.S. Publication No. US 2012/0280477.
Notice of Allowance and Fee(s) Due mailed Apr. 10, 2013 in co-pending U.S. Appl. No. 12/645,130, now published as U.S. Pulication No. US 2011/0148077.
Amendment and Response to Office Action filed Apr. 4, 2013 in co-pending U.S. Appl. No. 13/270,462, now published as U.S. Publication No. US 2012/0025496.
Notification of Transmittal of the International Search Report and the Written Opinion of the International Searching Authority mailed Jan. 4, 2013 in International Application No. PCT/US2012/058873.

* cited by examiner

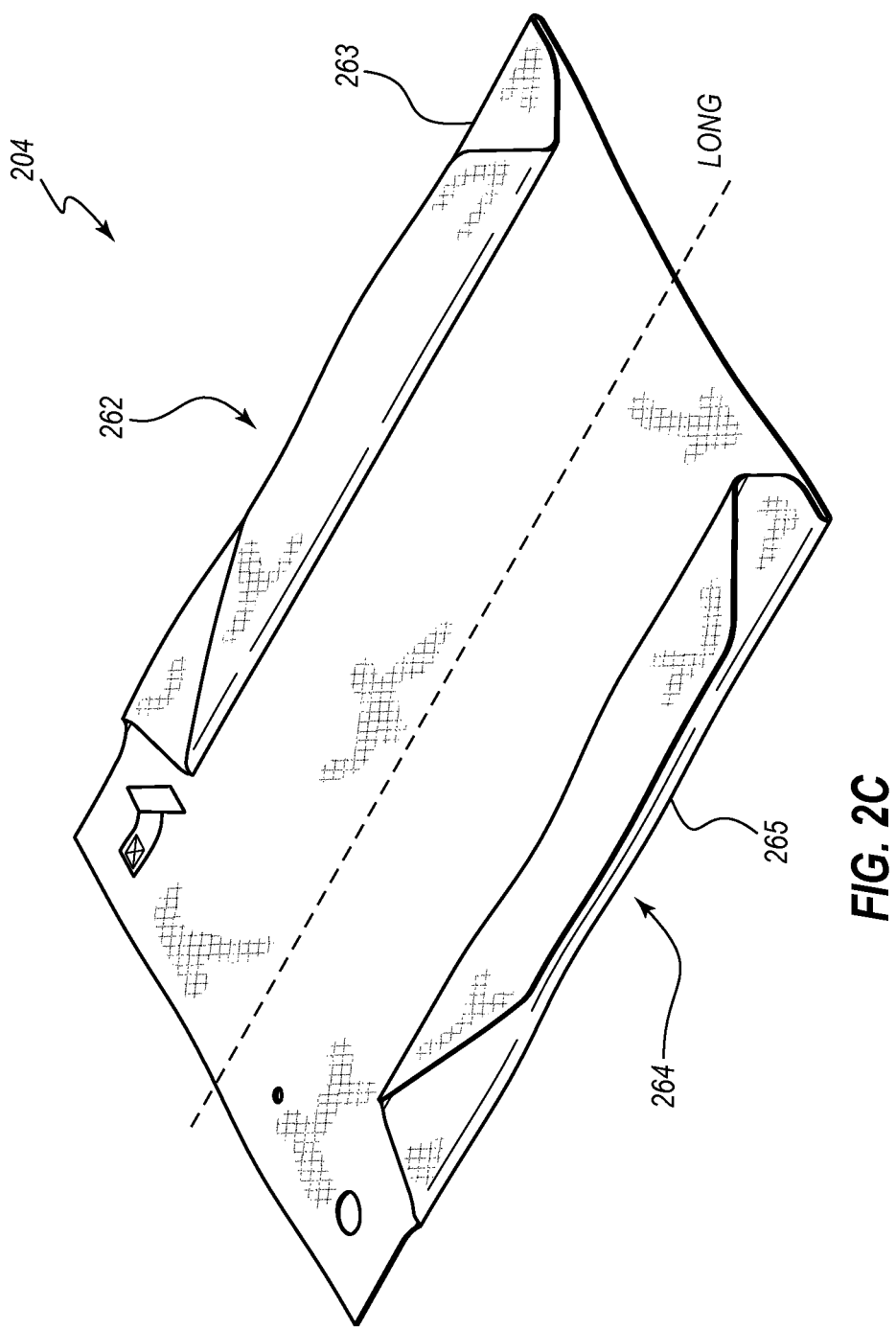

INFLATABLE KNEE AIRBAG ASSEMBLIES WITH CUSHION FOLD PATTERN

TECHNICAL FIELD

The present disclosure relates generally to the field of automotive protective systems. More specifically, the present disclosure relates to inflatable airbag cushions and related assemblies, such as knee airbags and knee airbag assemblies.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 2C is another perspective view of the airbag cushion of FIG. 2A shown in a further stage of the folding and/or assembly procedures in which a portion of each lateral region has been folded outwardly away from the longitudinal central axis of the airbag cushion;

DETAILED DESCRIPTION

Figure 1A:
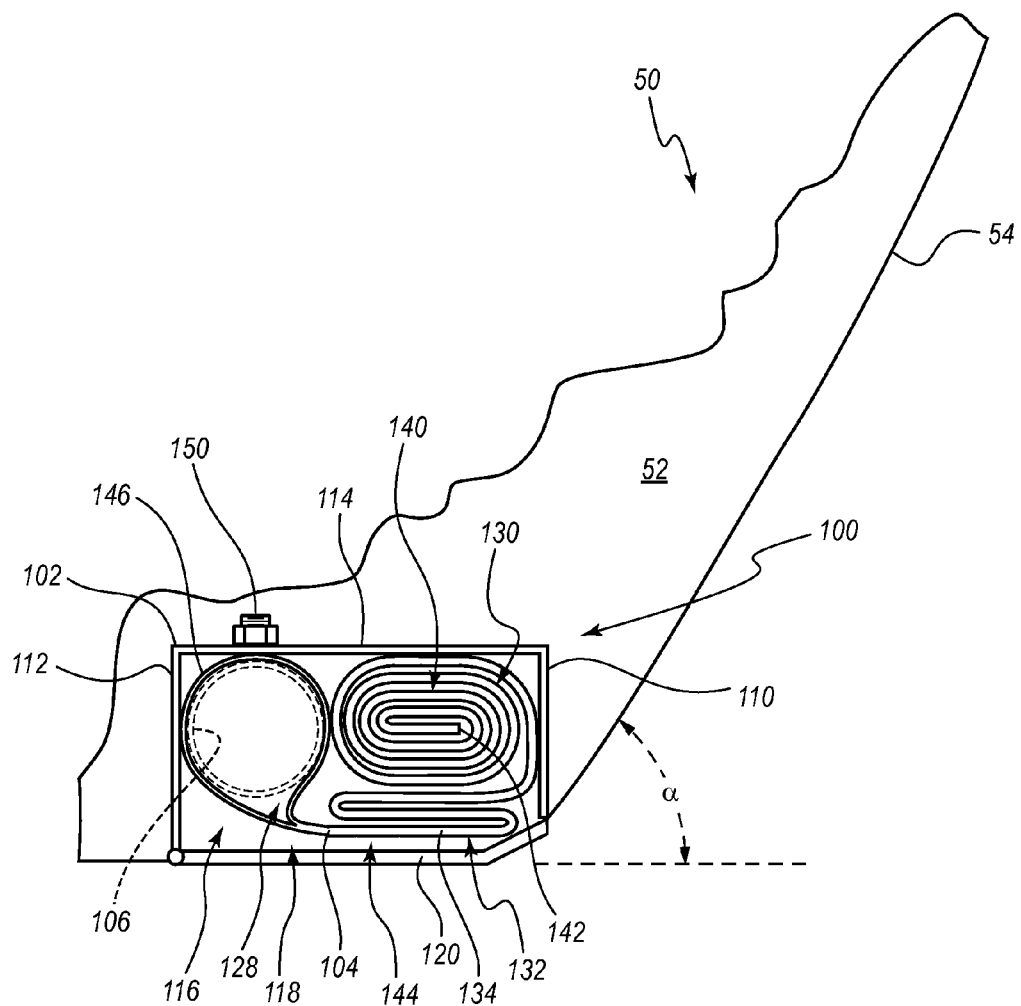
FIG. 1A is a side elevation cutaway view of an embodiment of airbag assembly mounted within a vehicle at a lower end of a front panel, wherein the airbag assembly includes a housing and an inflatable airbag cushion, and wherein the airbag cushion is in a packaged state within the housing.

It will be readily understood that the components of the embodiments as generally described and illustrated in the figures herein could be arranged and designed in a wide variety of different configurations. Thus, the following more detailed description of various embodiments, as represented in the figures, is not necessarily intended to limit the scope of the disclosure, as claimed, but is representative of various embodiments. While various aspects of the embodiments are presented in drawings, the drawings are not necessarily drawn to scale unless specifically indicated.

The phrases "coupled to" and "in communication with" are used in their ordinary sense, and include any suitable form of interaction between two or more entities, including mechanical, electrical, magnetic, electromagnetic, fluid, and thermal interaction. The term "coupled to" connotes some form of connection, although two components may be coupled to each other without being in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, knee airbag, or any other airbag type. The embodiments discussed hereafter are primarily of a front airbag variety, and more particularly, a knee airbag variety, although it may be possible to employ at least some of the features of these airbags with other airbag varieties.

Front airbags are typically installed in the steering wheel and/or front panel (e.g., the instrument panel, dashboard panel, or other panel) of a vehicle. During assembly and/or installation, the airbags can be rolled, folded, and/or otherwise packaged, and they can be retained in the packaged state. During a collision event, vehicle sensors can trigger the activation of an inflator, which rapidly fills the airbag with inflation gas. The airbag can rapidly change conformation from the packed configuration to an expanded configuration.

Knee airbags can generally be installed at the lower end of a front panel such that they can generally be in the vicinity of the feet, ankles, or shins of a vehicle occupant (driver or passenger). For example, in some arrangements, the knee airbags are positioned generally above the feet of a vehicle occupant. In some arrangements, a knee airbag can be generally aligned with one of the steering wheel or the glove compartment in a cross-vehicle or transverse direction, and the knee airbag can be lower than and forward of the steering wheel or the glove compartment. When deployed, the knee airbags can generally inflate in a rearward and upward direction toward a vehicle occupant position. Directional terms, such as "lateral," "upward," "forward," "rearward," and the like, are used herein with respect to vehicle. For example, by being forward of the steering wheel, a packaged airbag can be closer to the front of the vehicle than the steering wheel is. Likewise, by deploying in a rearward direction, an airbag can progress toward the back of the vehicle.

Figure 1B:
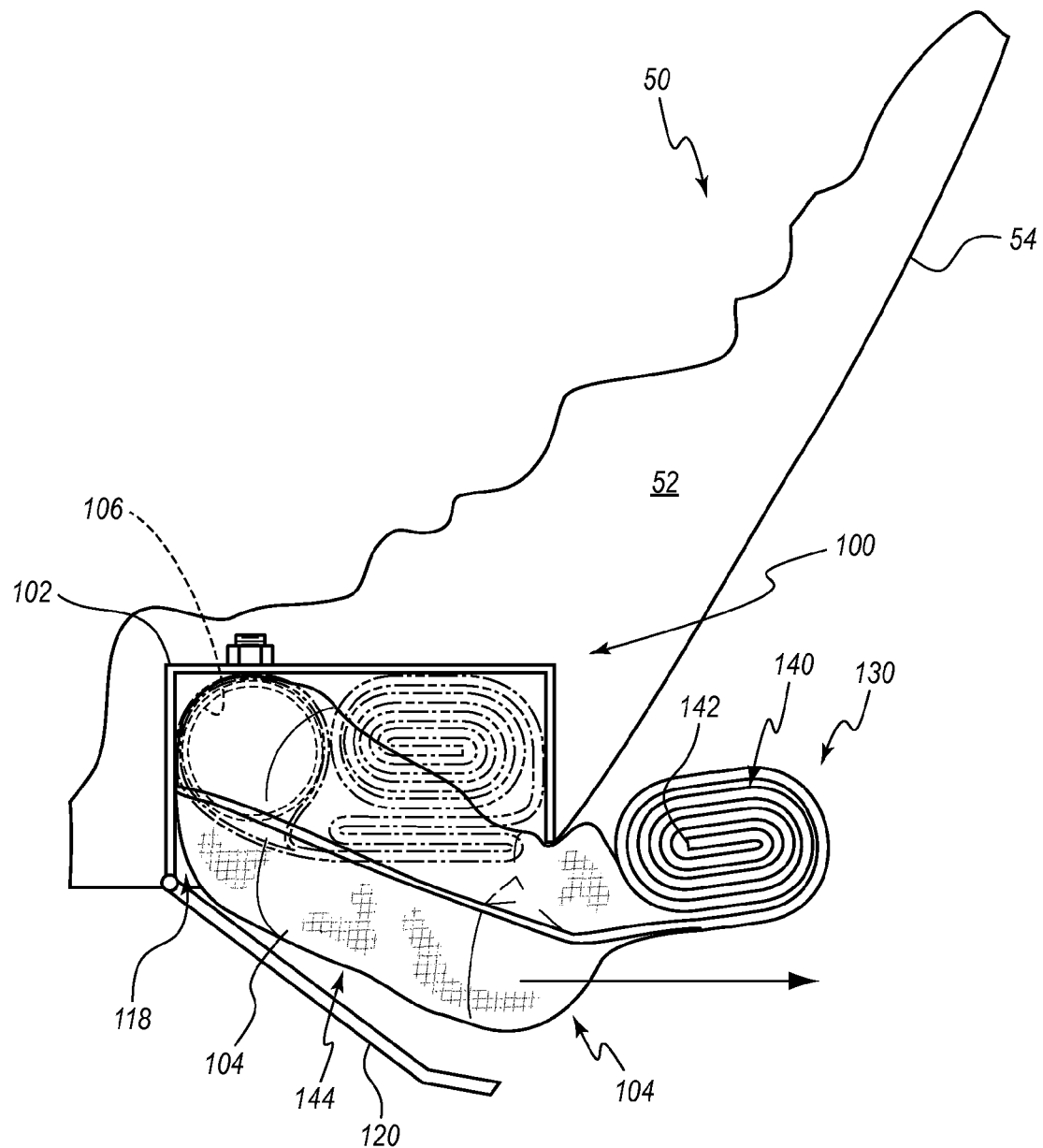
FIG. 1B is another side elevation cutaway view of the airbag assembly of FIG. 1A in an early stage of deployment of the airbag cushion.
Figure 1C:
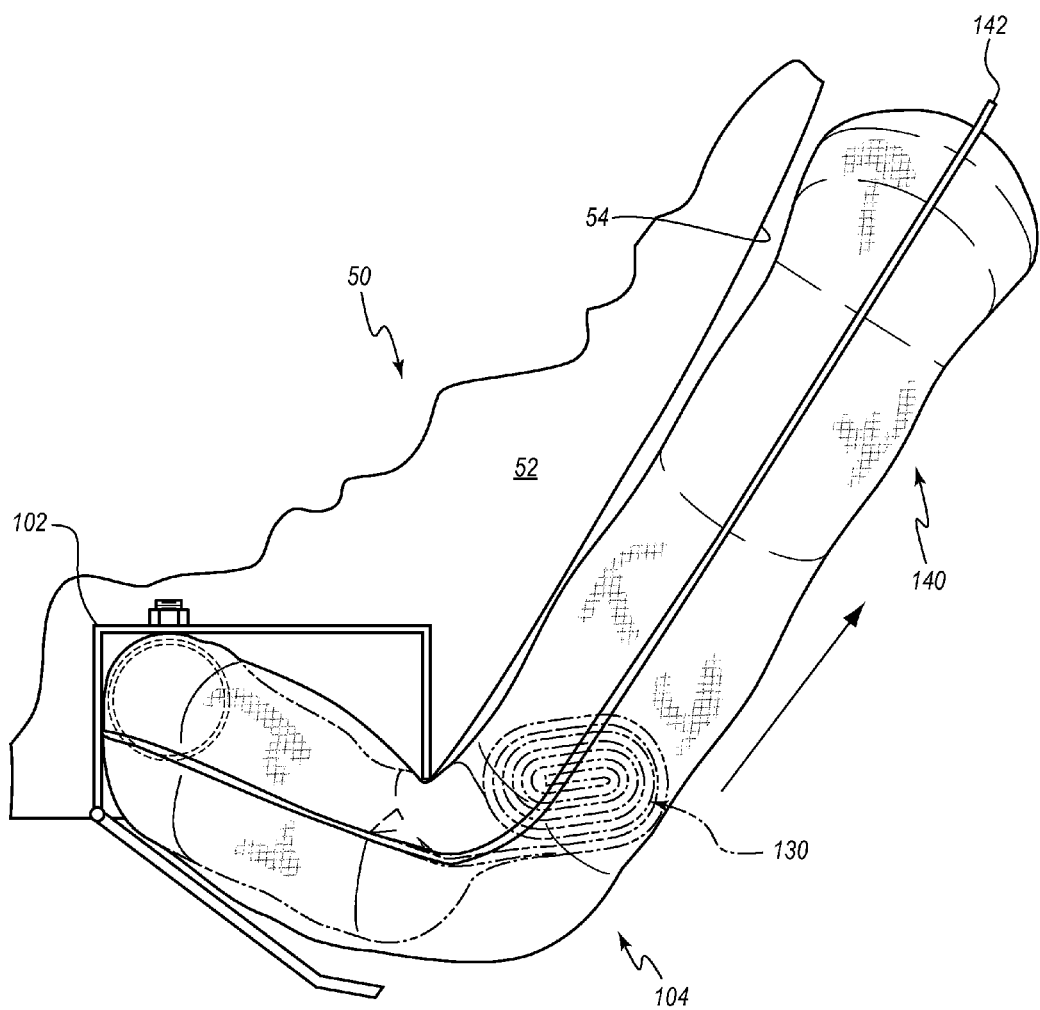
FIG. 1C is another side elevation cutaway view of the airbag assembly of FIG. 1A showing the airbag cushion in a fully deployed state.

FIGS. 1A-1C illustrate an embodiment of an airbag assembly 100 that is installed in a vehicle 50. The airbag assembly 100 can be mounted to the vehicle 50 in any suitable manner, such as those presently known in the art. In the illustrated embodiment, the airbag assembly 100 is attached to the vehicle at a lower end of a front panel 52, such as an instrument panel or dashboard. The airbag assembly 100 thus may also be referred to as a low mount knee airbag assembly. The front panel 52 can define a rear surface 54 that faces toward a vehicle occupant position. The rear surface 54 can be angled from the horizontal in an upward and rearward direction. The angle α generally defined by the rear surface 54 relative to the horizontal can vary by vehicle type. For example, in various embodiments, the angle α may be within a range of from about 40 degrees to about 75 degrees.

The airbag assembly 100 includes a housing 102, an inflatable airbag cushion 104, and an inflator 106. The housing 102 can be of any suitable variety and may comprise any suitable material or materials. In certain embodiments, the housing 102 can comprise a rigid material, such as metal and/or plastic. The housing 102 can include one or more walls. For example, in the illustrated embodiment, the housing 102 defines a generally parallelepiped configuration (see FIG. 2D), and it includes a rear wall 110 and a front wall 112 that each extend downwardly from and substantially perpendicular to an upper wall 114. In other embodiments, the distinctions among the rear, front, and side walls 110, 112, 114 may not be as distinct. For example, in other embodiments, the housing 102 may define a more rounded or domed configuration such that a substantially continuous wall defines a front, rear, and upper wall regions. Each such region can function as and be referred to as an individual wall, wall portion, or wall region. Due to the rigid nature of the housing 102, the walls 110, 112, 114 can remain fixed relative to each other, even when substantial forces (e.g., forces imparted by inflation gases during deployment of the airbag 104) are applied thereto.

The walls 110, 112, and 114 can cooperate to define at least a portion of a cavity 116 that is sized to receive the airbag 104 when it is a stowed or packaged configuration, such as that illustrated in FIG. 1A. The housing 102 can further define a deployment opening 118. In the illustrated embodiment, the deployment opening 118 is at a lower end of the housing 102 when the housing 102 is installed in the vehicle 50. In particular, at least a portion of the deployment opening 118 is defined by the lower edges of the rear and front walls 110, 112.

In certain embodiments, the assembly 100 can include a cover 120, which can span at least a portion of the deployment opening 118. For example, the cover 120 can completely or partially cover the deployment opening 118 so as to partially or completely enclose the airbag 104 within the cavity 116. The cover 120 can be of any suitable variety. In the illustrated embodiment, the cover 120 is a relatively solid or inflexible piece that is hinged at a forward end thereof so as to swing open to permit the airbag 104 to be deployed from the cavity 116 (see FIG. 1B). In other or further embodiments, the cover 120 can be relatively flexible so as to yield or bend when the airbag 104 presses against it during inflation. In other or further embodiments, the cover 120 (or a junction between the cover 120 and the housing 102) can include a weakened area, such as a seam (or a weakly adhered interface), and can be configured to tear, burst, or otherwise separate to permit the airbag cushion 104 to pass through it and/or by it.

The inflatable airbag cushion 104 can be of any suitable variety and composition. The airbag cushion 104 can define an inflatable membrane that includes one or more pieces of any suitable material, such as those that are well known in the art (e.g., woven nylon fabric). The membrane can define a cavity or void 128 that can receive inflation gases therein. The airbag cushion 104 may be manufactured using a variety of techniques, such as, for example, one-piece weaving, "cut and sew," and/or a combination of the two techniques. In various embodiments, the cushion membrane may be manufactured using sealed or unsealed seams, wherein the seams are formed by stitching, adhesive, taping, radio frequency welding, heat sealing, or any other suitable technique or combination of techniques. Another airbag cushion is discussed in further detail below, with respect to FIGS. 2A-2G, which can resemble the airbag cushion 104. Illustrative examples of airbag cushions that may be suitably used with the airbag assembly 100 are disclosed in U.S. patent application Ser. No. 12/430,562, filed Apr. 27, 2009, titled KNEE AIRBAG ASSEMBLIES CONFIGURED FOR INFLATOR INSERTION AND INFLATOR-MEDIATED COUPLING TO AN AIRBAG HOUSING, which published on Oct. 28, 2010 as U.S. Patent Application Publication No. 2010/0270775; U.S. patent application Ser. No. 12/430,274, filed Apr. 27, 2009, titled KNEE AIRBAGS AND INTERNAL TETHERS PRODUCED FROM SINGLE PANELS OF MATERIAL, which published on Oct. 28, 2010 as U.S. Patent Application Publication No. 2010/0270779; U.S. patent application Ser. No. 12/430,246, filed Apr. 27, 2009, titled INFLATABLE KNEE AIRBAG ASSEMBLIES WITH BAG STRAPS FOR WRAPPING THE AIRBAGS AND OPTIMIZING DEPLOYMENT, which published on Oct. 28, 2010 as U.S. Patent Application Publication No. 2010/0270782; and U.S. patent application Ser. No. 13/270,462, filed Oct. 11, 2011, titled KNEE AIRBAG ASSEMBLIES AND RELATED METHODS, which published on Feb. 2, 2012 as U.S. Patent Application Publication No. 2012/0025496. The contents of each of the foregoing applications and publications are hereby incorporated by reference herein.

As previously mentioned, the airbag cushion 104 is shown in a packaged configuration in FIG. 1A. In FIGS. 1B and 1C, the airbag cushion 104 is shown in various stages of deployment. When in the packaged configuration (FIG. 1A), the airbag cushion 104 can include a rolled portion or rolled region 130 and an accordion folded region 132. The accordion folded region 132 can include a deployment accordion fold 134, which includes at least two layers of the airbag cushion 104 where the airbag cushion 104 has been folded back upon itself, as discussed further below.

The rolled region 130 can include at least a portion of a distal portion 140 of the airbag cushion 104, as discussed further below with respect to the embodiment of FIGS. 2A-2G. For example, in the illustrated embodiment, a distal end 142 of the airbag cushion 104 is positioned at an interior of the rolled region 130. The folded region 132, and more specifically, the deployment accordion fold 134, can include at least a portion of a proximal portion 144 of the airbag cushion 104. The terms "proximal" and "distal" are used relative to the inflator 106. In the illustrated embodiment, at least a portion of the inflator 106 is received within the inflatable void 128 of the airbag cushion 104 at a proximal end 146 thereof. In particular, a portion of the inflator 106 from which inflation gases are released can be in fluid communication with the inflatable void. The airbag cushion 104 is coupled with the housing 102 via the inflator 106. For example, the cushion 104 can be sandwiched, and in abutting contact, between the inflator 106 and the upper wall 114 of the housing 102. One or more fastening members 150 (e.g., bolts) can extend from the inflator 106 through the housing 102 so as to fixedly secure the inflator 106 to the housing 102 (e.g., via one or more corresponding bolts).

When the airbag cushion 104 is in the packaged configuration, the rolled region 130 can be adjacent to one or more of the walls of the housing 102. In the illustrated embodiment, the rolled region 130 is adjacent to each of the rear wall 110 and the upper wall 114 of the housing 102. As further discussed below, one or more of the walls to which the rolled region 130 is adjacent can act as a reaction surface against which the airbag cushion 104 may press (or be pressed) during early stages of deployment. The term "adjacent" is used herein in its ordinary sense, and includes configurations where one component of the assembly 100 is either at or near another component of the assembly 100 without any other component of the assembly 100 being positioned between the adjacent components.

In the illustrated embodiment, the deployment accordion fold 134 is positioned below the rolled region 130. A portion of the accordion fold 134, which is formed by a lower layer of the airbag cushion 104, is positioned adjacent to the deployment opening 118 of the housing 102. The accordion fold 134 may also be said to be adjacent to the cover 120. In some embodiments, the accordion fold 134 is in abutting contact with the cover 120 so as to be retained within the cavity 116 thereby.

Two stages of a deployment sequence are illustrated in FIGS. 1B and 1C. In each drawing, the previous position of the airbag cushion 104 is shown in broken lines. As shown in FIG. 1B, at least a portion of the proximal portion 144 of the airbag cushion 104 can expand through the deployment opening 118 and open the cover 120. Stated otherwise, the accordion fold 134 can inflate or expand so as to open the cover 120. Thereafter, the rolled region 140 can be pulled, dragged, eased, or drawn out of the housing while inflation gas continues to fill the airbag cushion 104 from the proximal end toward the distal end 142. As shown by the arrows in FIG. 1B, the general direction of the momentum of the rolled region 134, once it has exited the housing, is generally horizontal, or not significantly downward.

The airbag cushion 104 is shown in a fully deployed state in FIG. 1C. As depicted by the arrow, the cushion 104 can expand upwardly and rearwardly along or near the rear surface 54 of the front panel 52 as the rolled region 130 expands and unrolls. Whereas other packaged configurations can impart significant initial downward momentum to the rolled region 130 as it exits the housing 102, the illustrated configuration provides relatively little or no downward momentum, such that the rolled region 130 can quickly move upward along or near the front panel 52. Accordingly, the overall trajectory of the airbag cushion 104 is more predominantly upward throughout a greater portion of the deployment sequence, as compared with other packaging configurations. This can permit the airbag cushion 104 to more quickly cover the rear surface 54 so as to protect a vehicle occupant from contact therewith in the event of a collision of the vehicle 50.

Stated another way, for certain packaging configurations that are less desirable than the embodiments discussed herein, a distal portion of the airbag cushion may be pushed from the housing, rather than pulled. When the housing is in a configuration such as that shown in FIG. 1A, this initial pushing can impart a significant downward momentum to the distal portion of the airbag cushion, which can be difficult to overcome so as to eventually allow the distal end of the airbag cushion to move upwardly. Such packaging configurations and deployment trajectories can inadequately and/or take longer to cover the panel 52 so as to protect a vehicle occupant from undesired contact therewith. In various embodiments discussed herein, the deployment accordion fold 134 and the rolled region 130 are positioned within the housing 102 in such a manner that deployment accordion fold 134 exits the housing before the rolled region 130, the rolled region 130 is "pulled" from the housing, the rolled region 130 has little or no downward momentum upon exiting the housing 102 that is overcome in order to unroll in an upward direction, and/or the rolled region 130 initially moves in a direction that is substantially transverse to the deployment opening upon exiting the housing 102. One or more of the foregoing properties can allow the rolled region 130 to quickly cover the panel 52.

In various embodiments, the airbag cushion 104 can be configured to naturally curve or expand upwardly from the low-mounted housing 102 due to forces imparted by the inflation gases. For example, in some embodiments, the airbag cushion 104 can include tethers (not shown), such as internal tethers, that are tensioned as the airbag cushion 104 inflates. The tension, or tensioning, can tend to direct the airbag cushion 104 upwardly. Likewise, the direction in which the rolled region 130 is rolled can influence the manner in which the airbag cushion 104 is deployed.

FIGS. 2A-2G depict another embodiment of an inflatable cushion airbag assembly 200 that can resemble the airbag assembly 100 described above in certain respects. Accordingly, like features are designated with like reference numerals, with the leading digits incremented to "2." Relevant disclosure set forth above regarding similarly identified features thus may not be repeated hereafter. Moreover, specific features of the airbag assembly 200 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 200. Any suitable combination of the features and variations of the same described with respect to the airbag assembly 100 can be employed with the airbag assembly 200, and vice versa.

FIGS. 2A-2G depict an illustrative method of a folding or packaging sequence for an airbag cushion 204. The airbag cushion 204 can be coupled with a housing 202 to form the assembly 200. Accordingly, the drawings may also be said to depict an illustrative method for packaging or assembling the assembly 200.

Figure 2A:
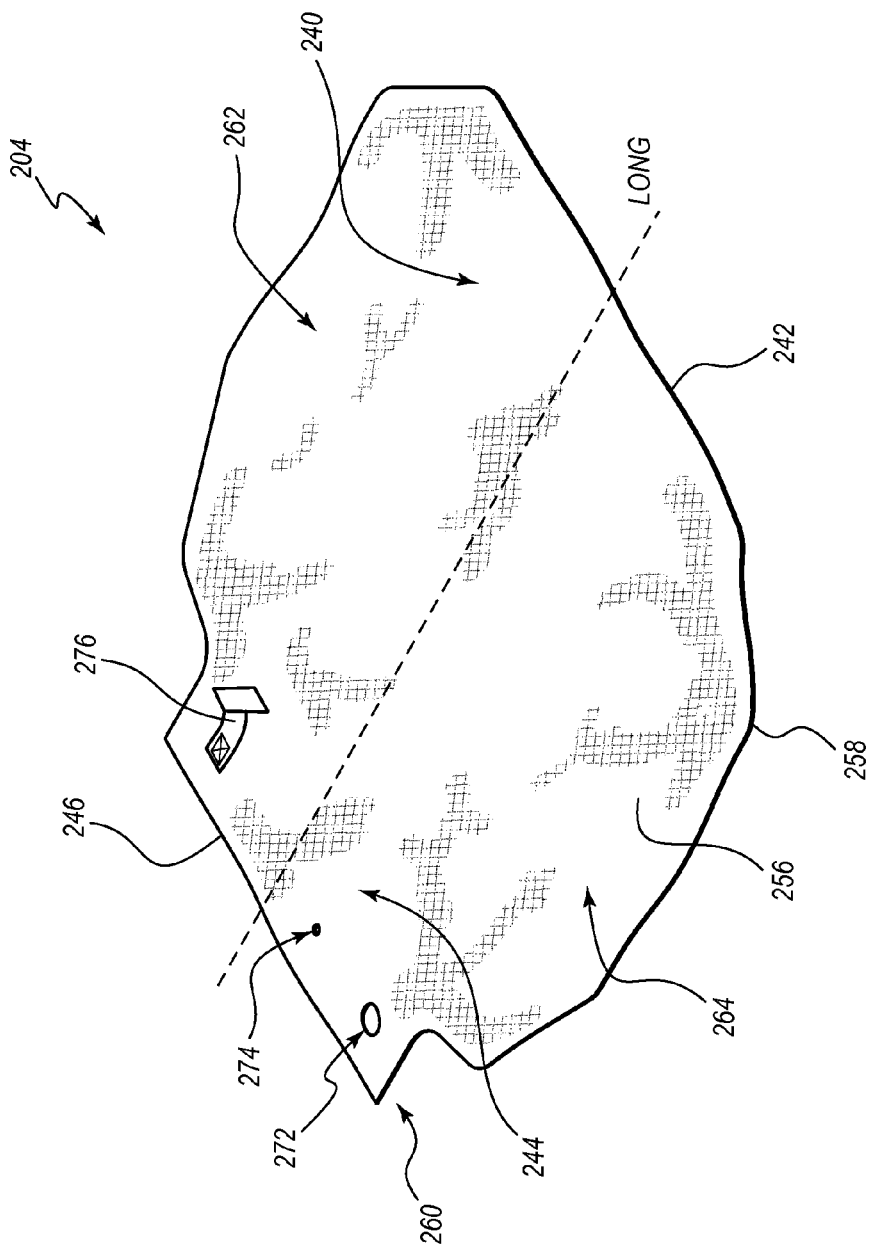
FIG. 2A is a perspective view of an embodiment of an airbag cushion that is suitable for use with the airbag assembly of FIG. 1A, wherein the airbag cushion is in a flattened state and is shown at an early stage in a folding procedure, which can also be an early stage of an assembly procedure for the airbag assembly.

As shown in FIG. 2A, the airbag cushion 204 can include a front panel 256 and a rear panel 258 that are joined to each other in any suitable manner about a periphery thereof to form an inflatable void. The airbag cushion 204 can define any suitable shape. In the illustrated embodiment, the shape is substantially octagonal, with one side of the octagon being extended. In the illustrated embodiment, the extended side defines a neck or throat 260, which is within a proximal region 244 of the airbag cushion 204. The throat 260 and the proximal region 244 can define a proximal end 246.

The airbag cushion 204 can include a distal region 240 that defines a distal end 242. The proximal and distal ends 246, 242 are at opposite sides of the airbag cushion 204. The airbag cushion 204 can further include a right and left lateral region 262, 264 that are at opposite sides of the cushion. The lateral regions 262, 264 can be on either side of a central longitudinal axis LONG that extends from the proximal end 246 to the distal end 242 of the airbag cushion 204. The lateral regions 262, 264 can comprise those portions of the airbag cushion 204 that extend laterally outwardly beyond a width defined by the throat 260. As discussed further below, the width of the throat 260 can correspond with a transverse width of the housing 202, such that the throat 260 can be received within the housing 202 without folding, rolling, or other compression thereof in the lateral direction, whereas the lateral regions 262, 264 cannot be received into the housing 202 without folding, rolling, or other compression of the airbag cushion 204 in the lateral direction.

The throat 260 of the airbag cushion 204 can include an inflator aperture 272 and a stem aperture 274 that provide openings into the inflatable void. A stabilizer strap 276 may also be coupled with the airbag cushion 204 in the region of the throat 260. These features are discussed further below, and like features are discussed in even greater depth in U.S. patent application Ser. No. 13/270,462, filed Oct. 11, 2011, titled KNEE AIRBAG ASSEMBLIES AND RELATED METHODS, which was incorporated by reference above.

Figure 2B:
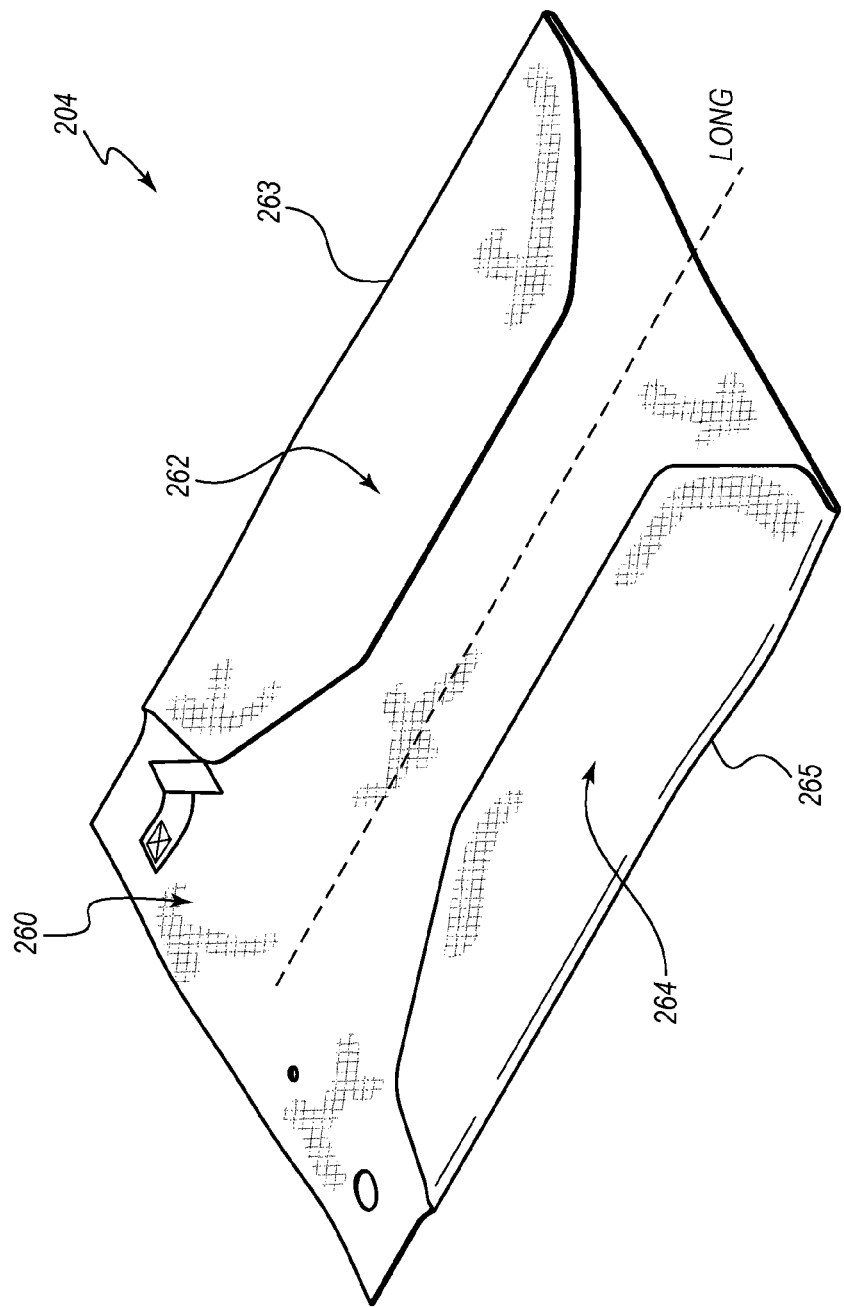
FIG. 2B is another perspective view of the airbag cushion of FIG. 2A shown in a further stage of the folding and/or assembly procedures in which at least a portion of lateral regions of the airbag cushion have been folded inward toward a longitudinal central axis of the airbag cushion.

FIG. 2B illustrates another stage of the illustrative method in which the lateral regions 262, 264 have been folded inward toward the longitudinal axis LONG. Accordingly, at either lateral end of the airbag cushion 204, a first (top) layer of the airbag is folded over onto a second (bottom) layer of the airbag cushion 204. Such a fold may be referred to as an accordion fold. The accordion fold includes each layer of material, as well as the apex at which those layers meet. In the illustrated embodiment, the apex 263, 265 of each accordion fold is positioned so as to extend longitudinally from the lateral edges of the throat 260. Accordingly, the transverse width of the folded airbag cushion 204 is about the same as the transverse width of the housing 202.

FIG. 2C illustrates another stage of the illustrative method in which an additional accordion fold is made in each of the lateral regions 262, 264. In the illustrated embodiment, the lateral edges of the lateral regions 262, 264 are brought into alignment with the apices 263, 265.

Figure 2D:
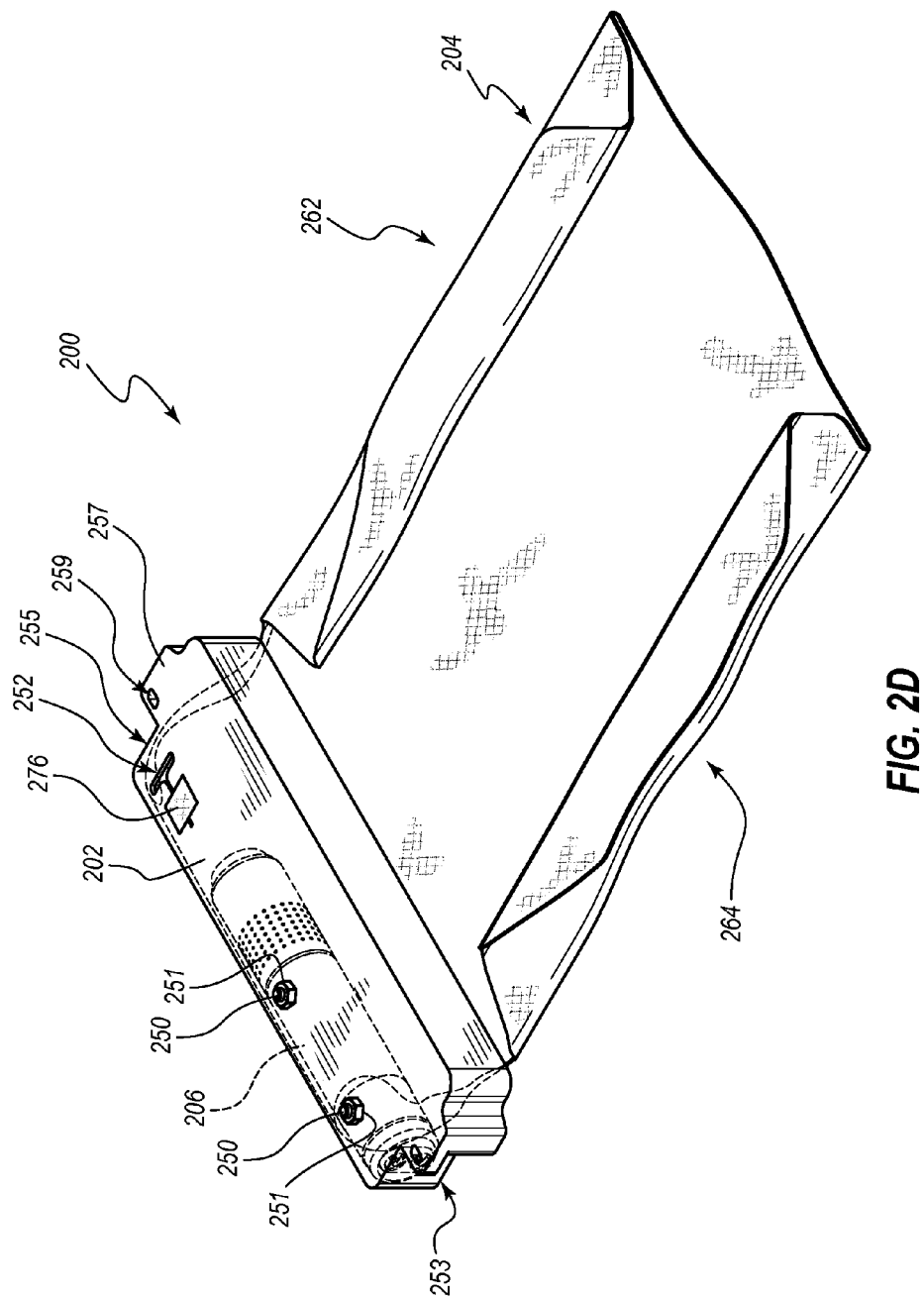
FIG. 2D is another perspective view of the airbag cushion of FIG. 2A shown in a further stage of the folding and/or assembly procedures in which a proximal portion of the airbag has been coupled with an embodiment of an inflator and an embodiment of a housing so as to form an embodiment of an airbag assembly.

FIG. 2D depicts another stage of the illustrative method in which the airbag cushion 204 is coupled with the housing 202. As with other steps and stages of the illustrative methods discussed herein, such coupling can take place at other stages of the method, as appropriate. In the illustrated embodiment, the airbag cushion 204 is coupled with the housing 202 via an inflator 206. A portion of the inflator 206, which may include a mounting stem 250 coupled thereto, can be inserted into the inflator aperture 272. The mounting stem 250 can be advanced from within the void of the cushion outwardly through the stem aperture 274. The inflator 206 may also include one or more additional mounting stems 250. The stems 250 can be advanced through openings in the housing (not shown) and coupled with nuts 251 to secure both the inflator 206 and the airbag 204 to the housing 202. The stabilizer strap 276 can be coupled with the housing 202 via a mounting opening 252, and the stabilizer strap 276 can prevent the airbag 204 from skewing when deployed.

The lateral width of the housing 202 can be defined by lateral sides 253, 255. Mounting protrusions 257 can extend from either side 253, 255, and may include mounting openings 259 through which mounting hardware can be advanced to couple the assembly 200 with a vehicle.

Figure 2E:
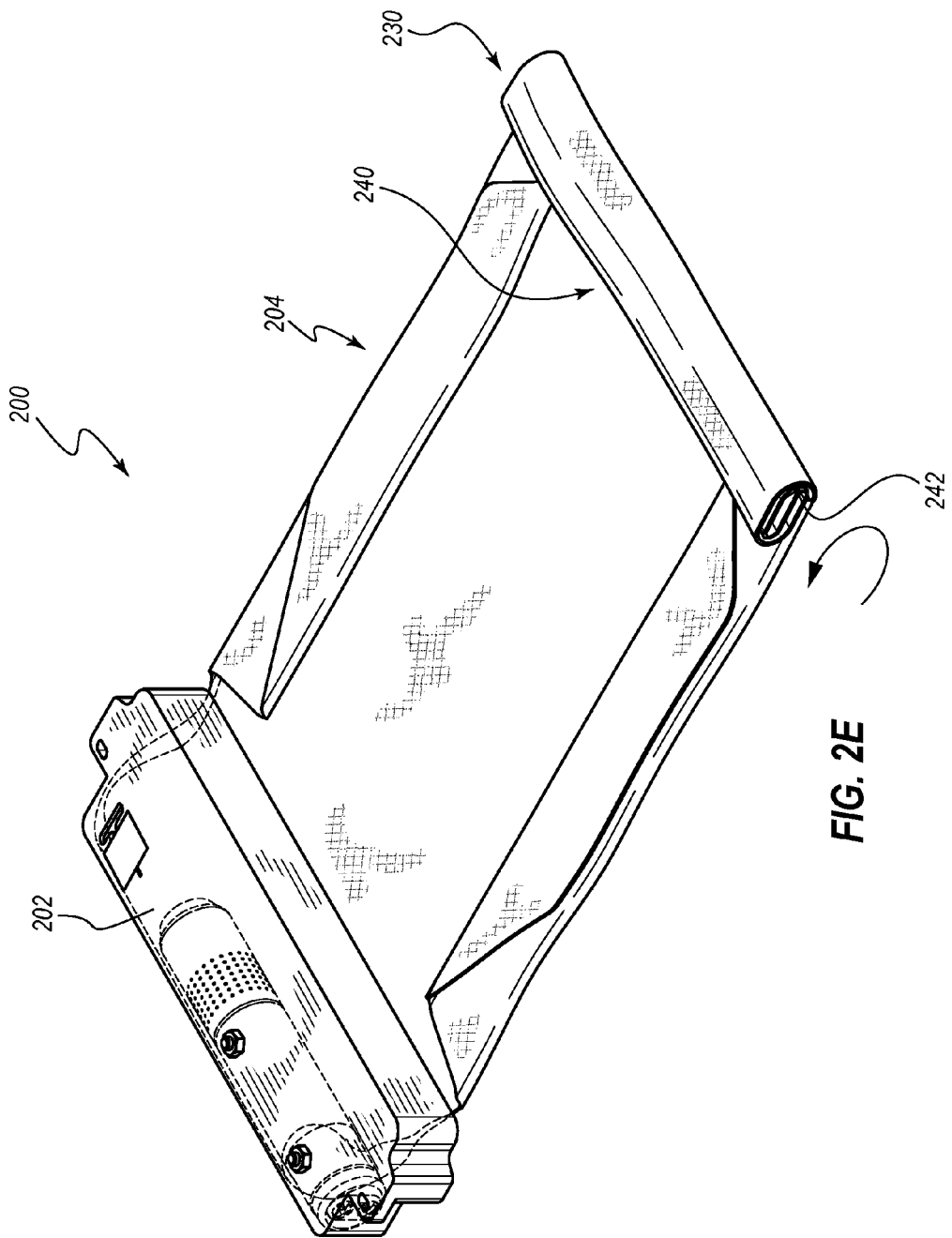
FIG. 2E is another perspective view of the airbag assembly of FIG. 2D, which includes the airbag cushion of FIG. 2A, shown in a further stage of the folding and/or assembly procedures in which at least a portion of a distal portion has been rolled toward a proximal end of the airbag cushion.

FIG. 2E depicts another stage of the illustrative methods. With a deployment opening (not shown) of the housing 202 facing down, the distal end 242 of the airbag cushion 204 can be rolled into an interior of a rolled region 230. In some embodiments, the initial roll can begin at a distance of about 30 millimeters from the distal end 242. Stated otherwise, the initial roll width can be about 30 millimeters, although other widths are possible. In beginning the rolling, the distal end 242 is moved forwardly over an upper face of the airbag cushion 204, and the rolling proceeds in a counterclockwise direction (as viewed from the left side shown in FIG. 2E) toward the housing 202.

Figure 2F:
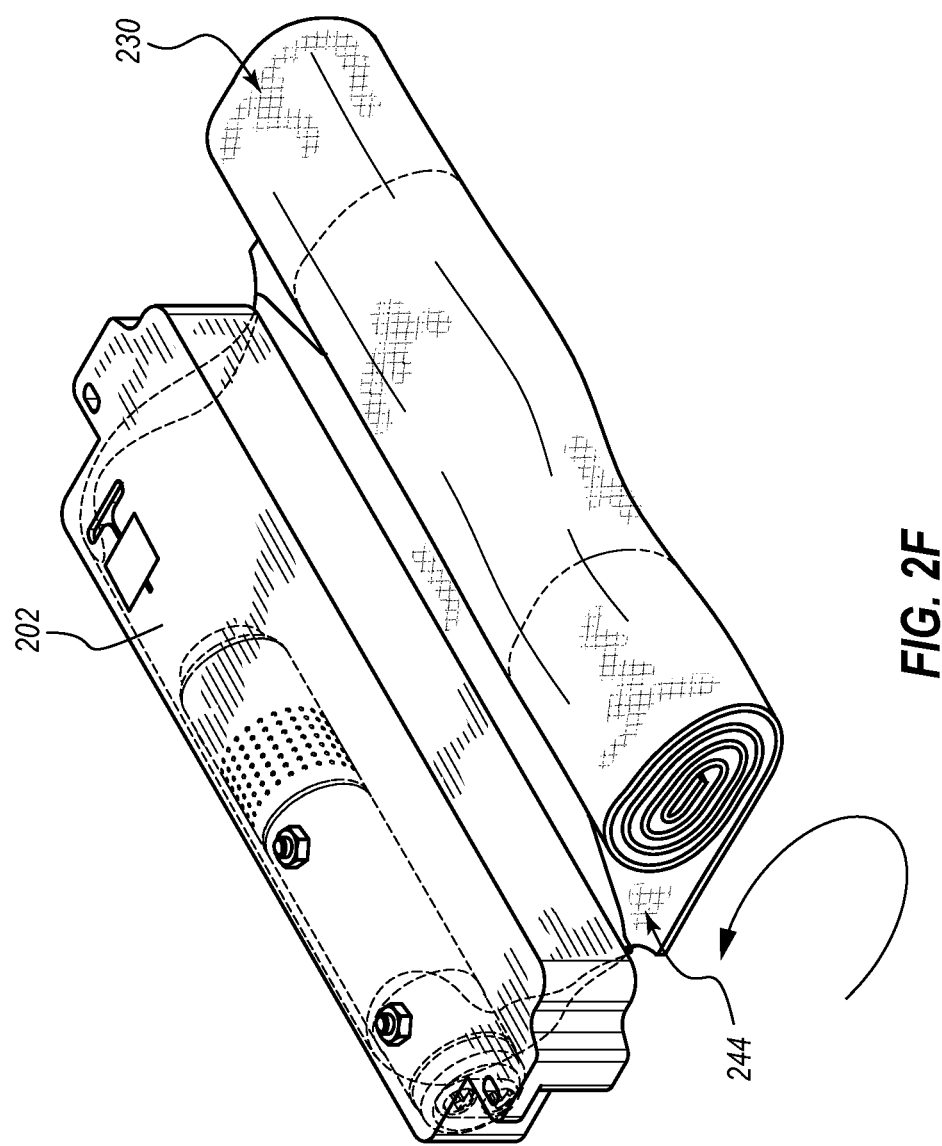
FIG. 2F is another perspective view of the airbag assembly of FIG. 2D, which includes the airbag cushion of FIG. 2A, shown in a further stage of the folding and/or assembly procedures in which a greater portion of the airbag cushion has been rolled toward the proximal end of the airbag cushion.
Figure 3A:
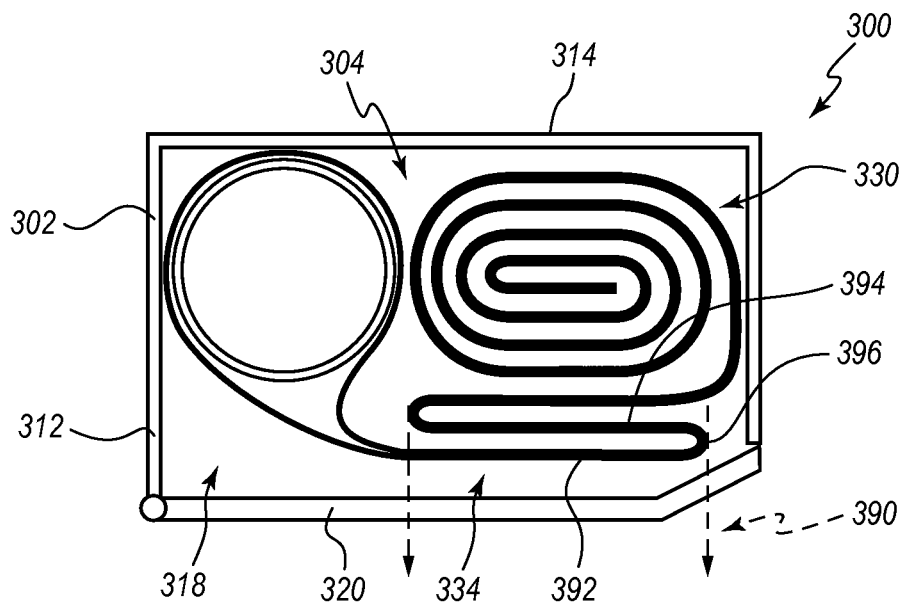
FIG. 3A is a schematic cross-sectional view of an embodiment of an airbag assembly, such as the airbag assembly of FIG. 2D, shown in the packaged configuration, wherein a deployment accordion fold is positioned beneath a rolled region of the airbag cushion.
Figure 3B:
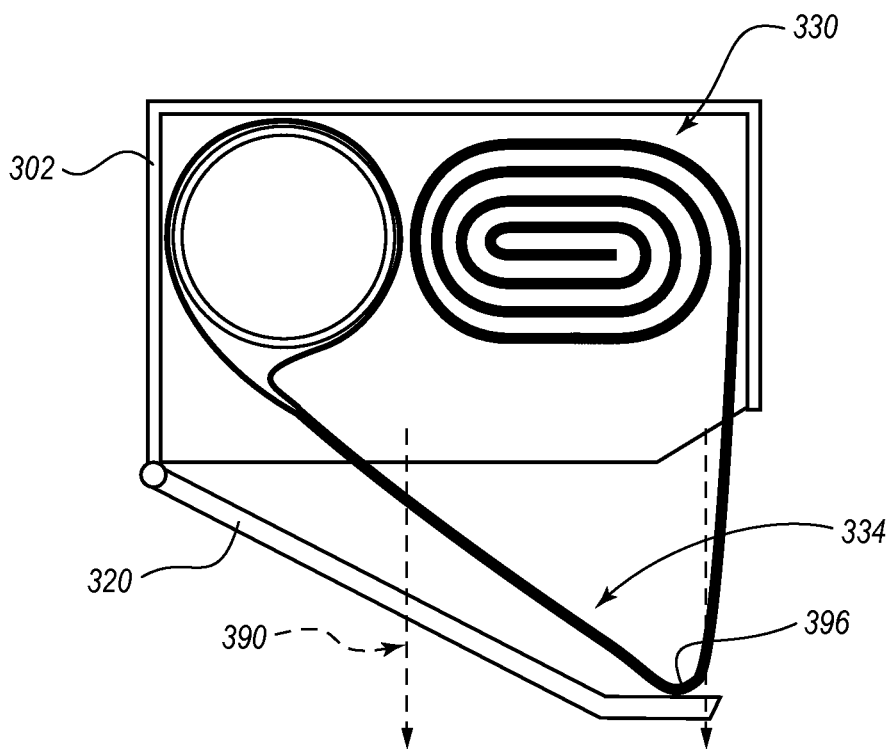
FIG. 3B-3G are schematic cross-sectional views of the airbag assembly of FIG. 3A in sequential stages of deployment of the airbag cushion.
Figure 3C:
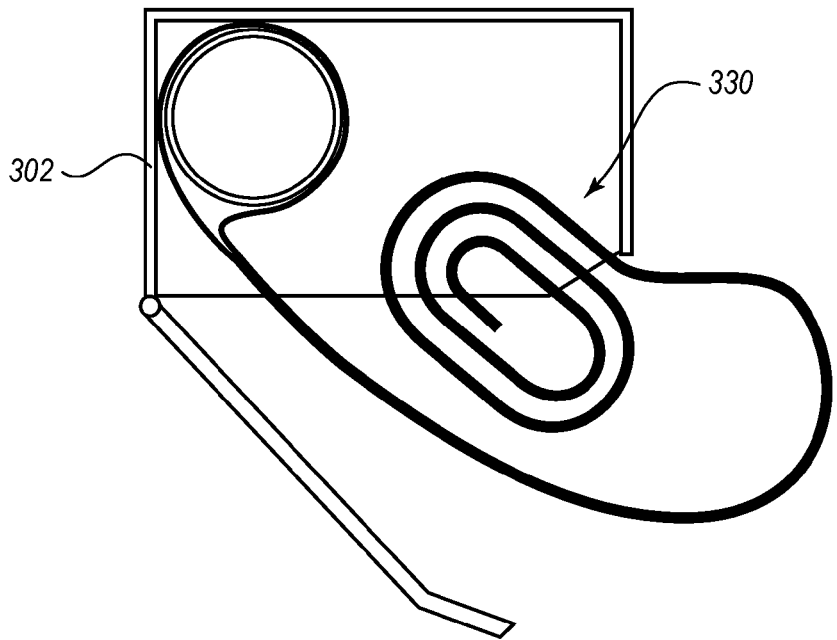
Figure 3D:
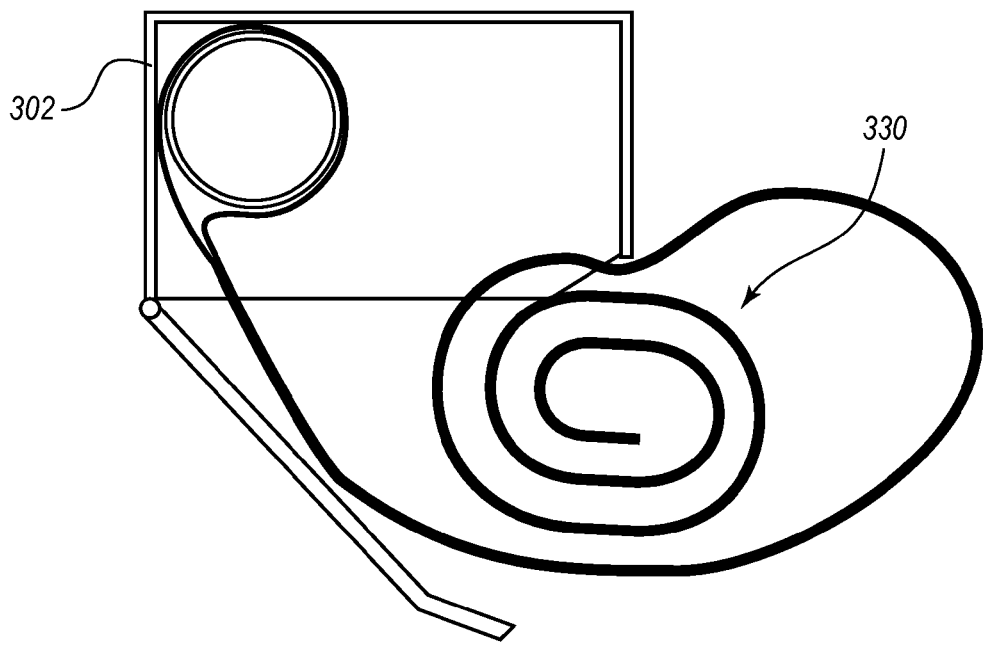
Figure 3E:
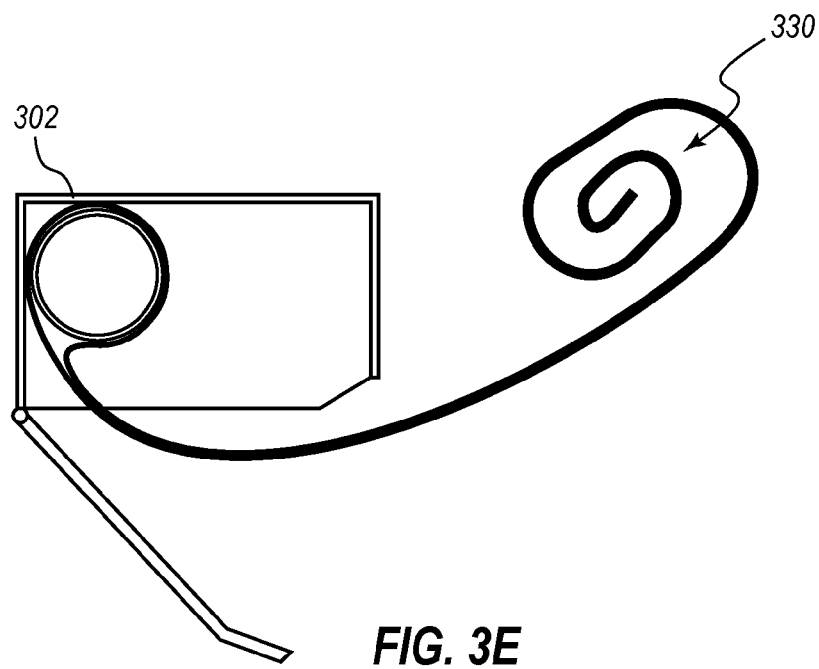
Figure 3F:
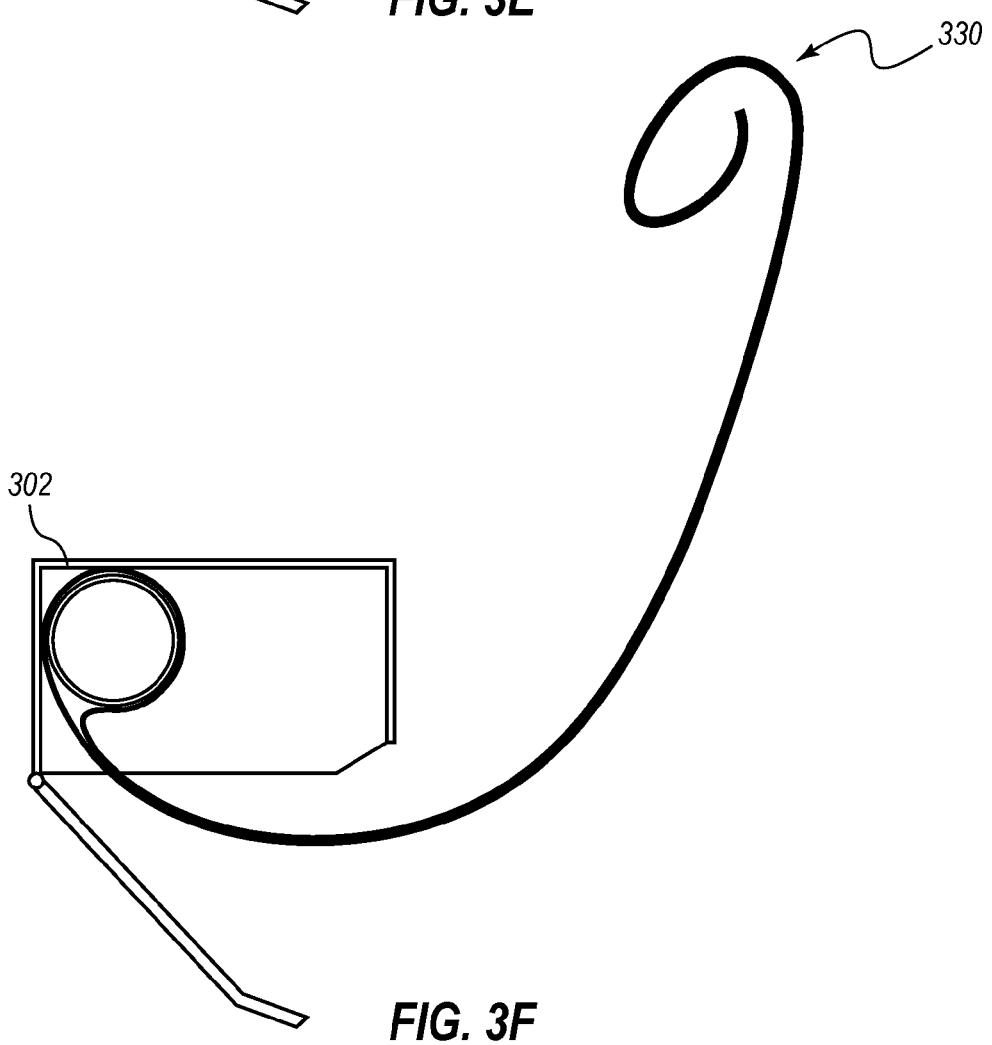
Figure 4A:
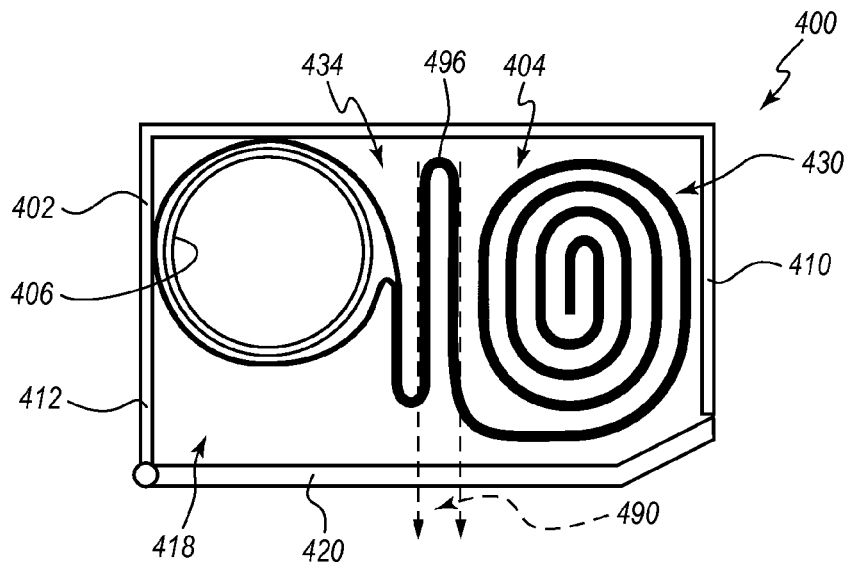
FIG. 4A is a schematic cross-sectional view of an embodiment of an airbag assembly, such as the airbag assembly of FIG. 2D, shown in the packaged configuration, wherein a deployment accordion fold is positioned adjacent to a rolled region of the airbag cushion.
Figure 4B:
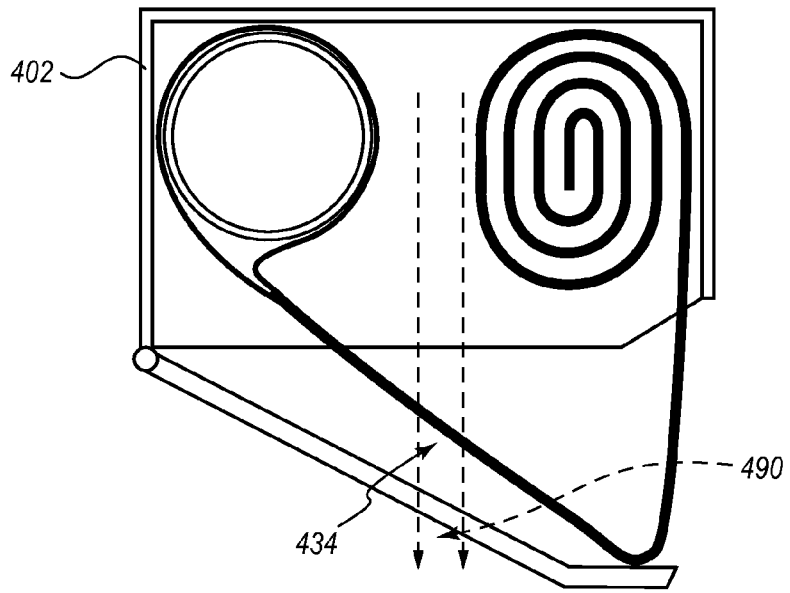
FIG. 4B-4G are schematic cross-sectional views of the airbag assembly of FIG. 4A in sequential stages of deployment of the airbag cushion.
Figure 4C:
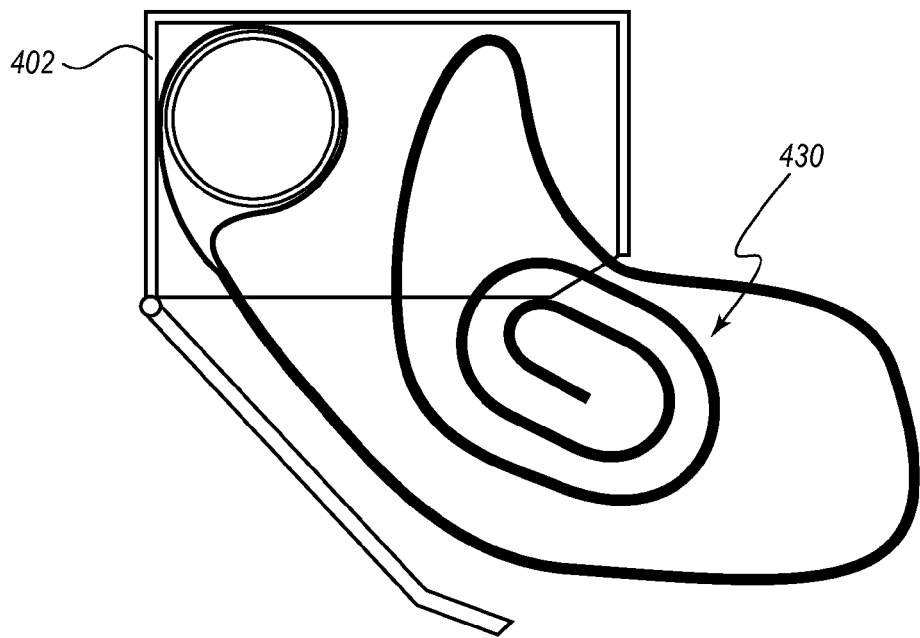
Figure 4D:
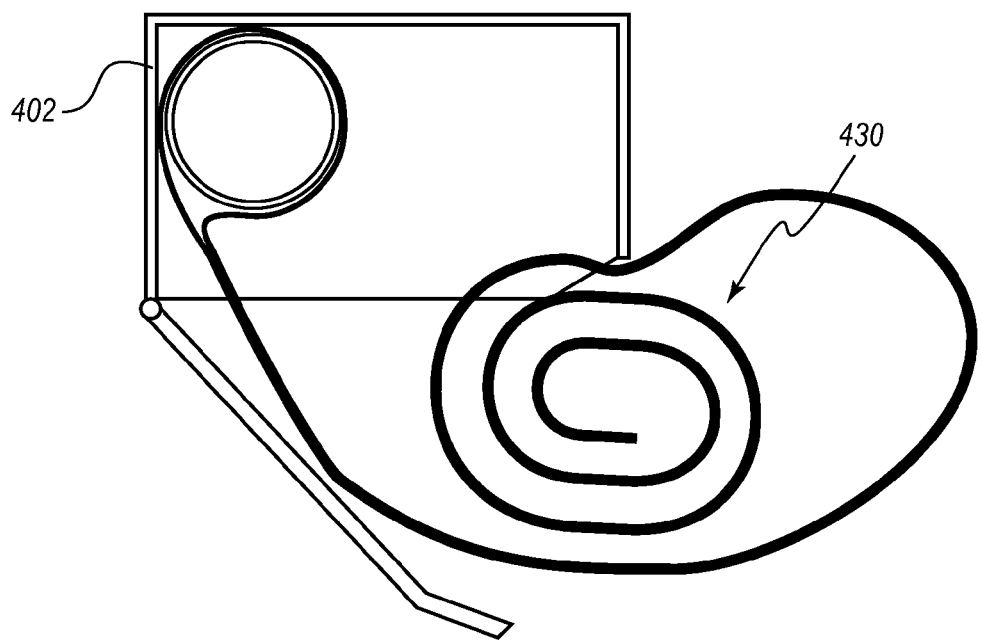
Figure 4E:
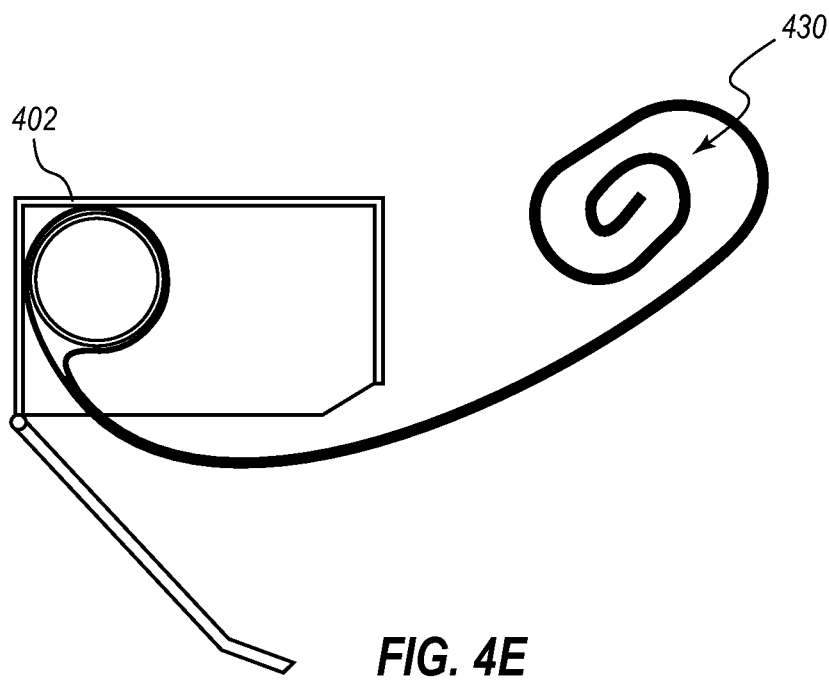
Figure 4F:
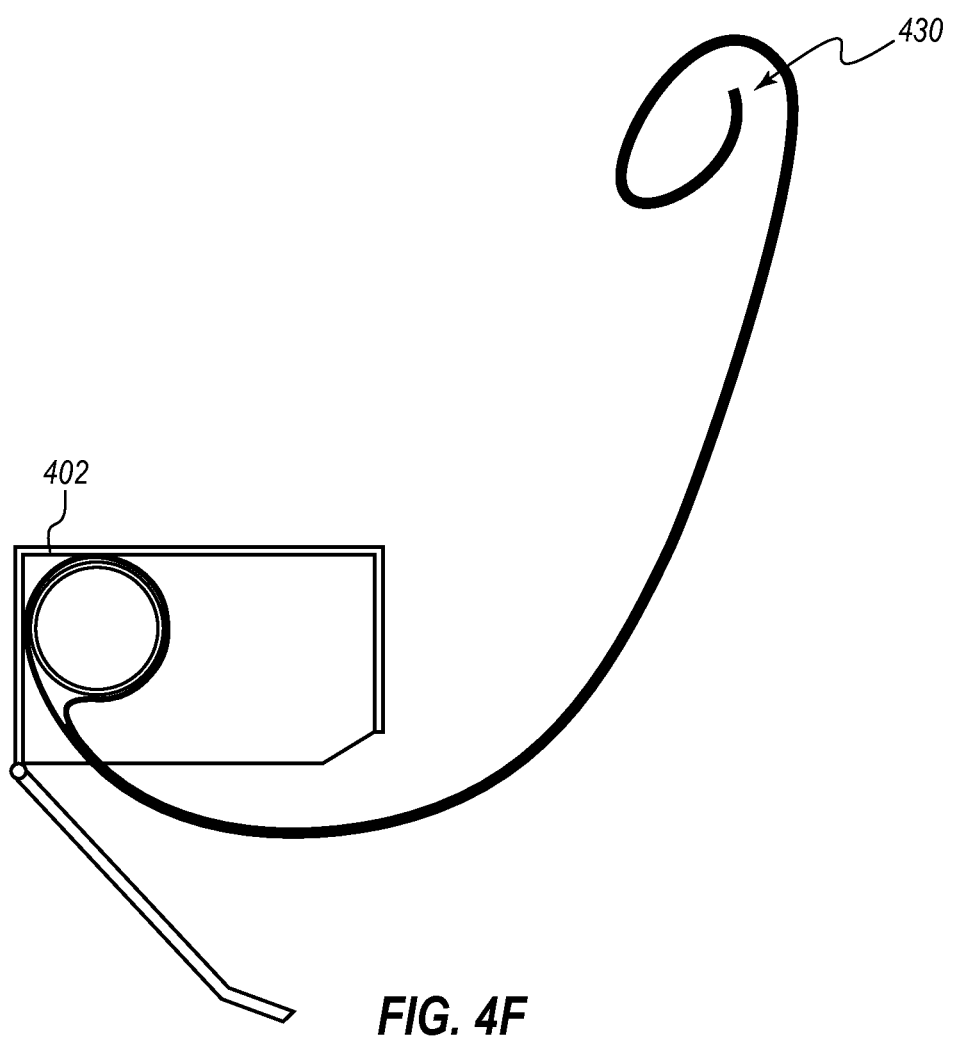

As shown in FIG. 2F, the rolled region 230 can be relatively large when it gets closer to the housing 202. A portion of the proximal portion 244 of the airbag cushion 204 can be left outside of the rolled region 204. A deployment accordion fold of any suitable variety can be formed from this portion of the airbag cushion 204. Different possibilities for the deployment accordion fold are discussed with respect to FIGS. 3A and 4A.

Figure 2G:
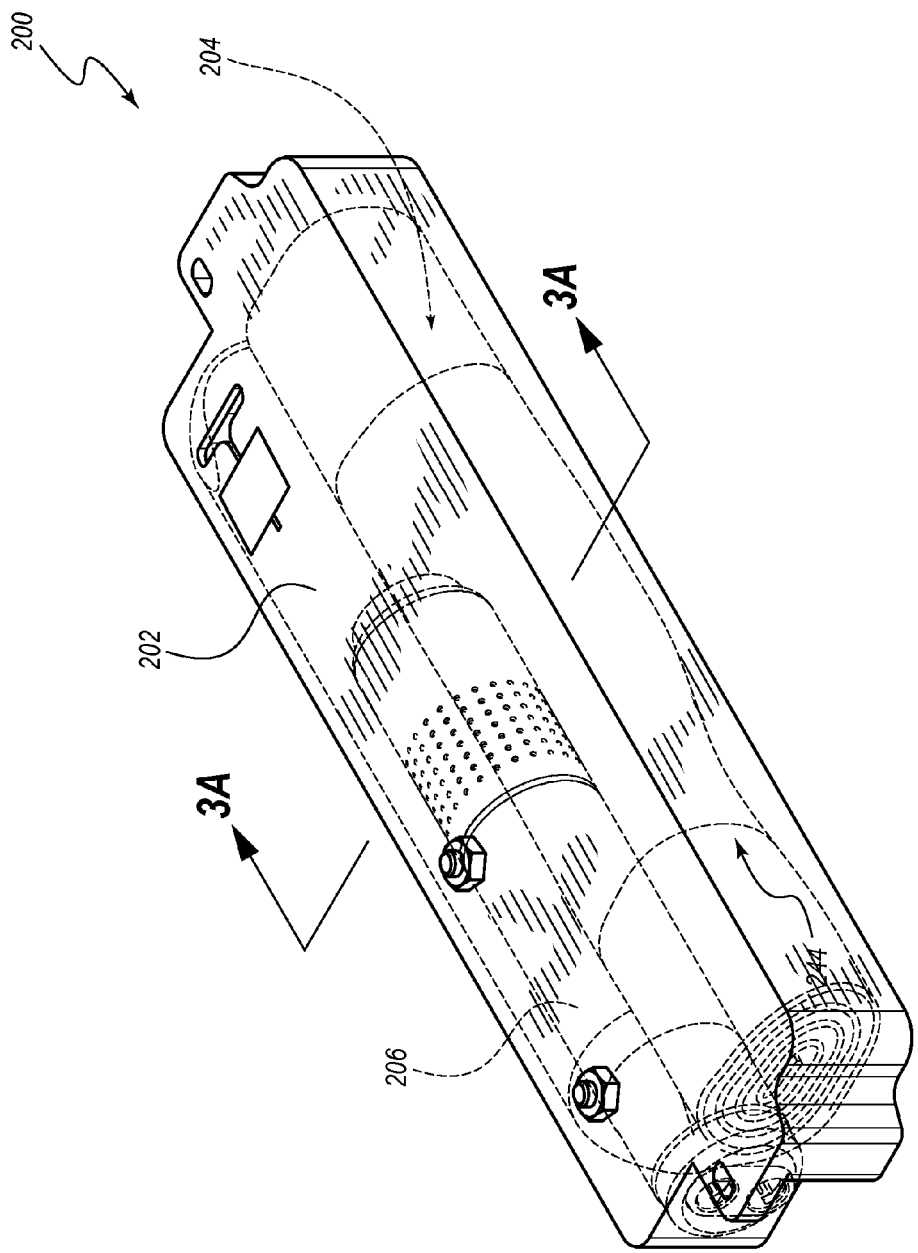
FIG. 2G is another perspective view of the airbag assembly of FIG. 2D showing the airbag cushion in a packaged state within the housing.
Figure 3G:
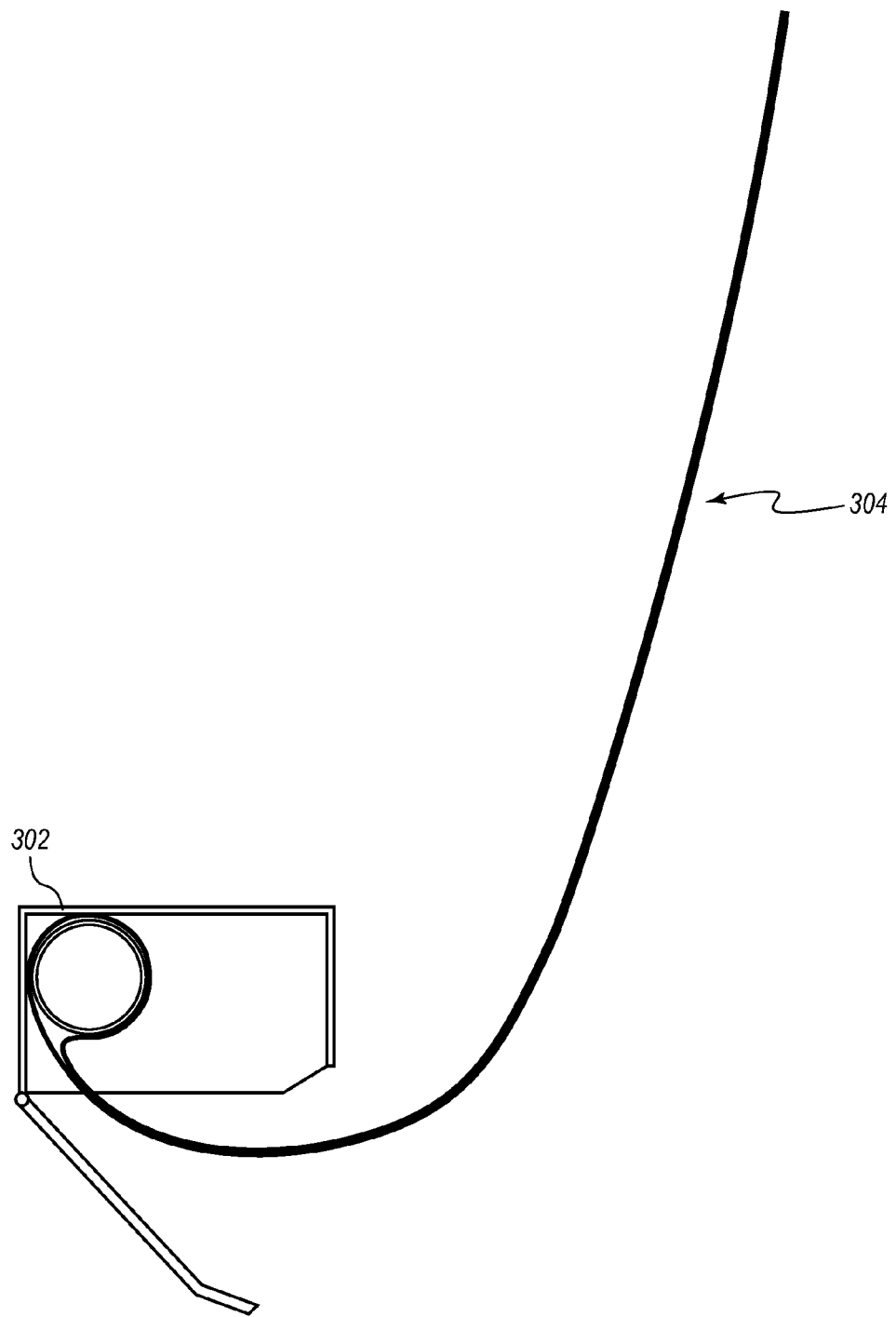
Figure 4G:
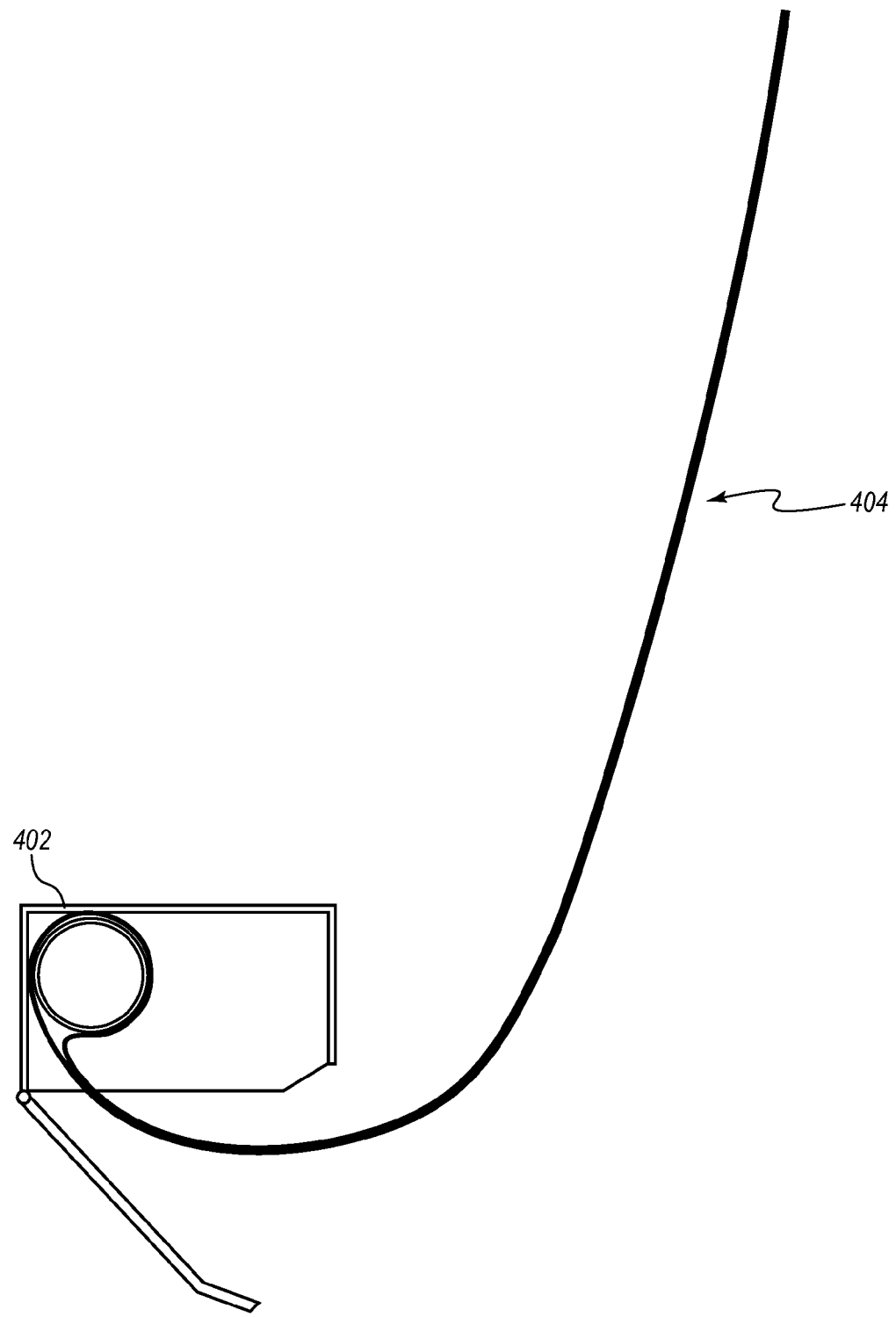

FIG. 2G depicts the assembly 200 in a completed or packaged state. The inflator 206 and the airbag cushion 204 are enclosed within the housing 202. The transition of an airbag cushion from the packaged state, such as that shown in FIG. 2G, to the deployed state, such as that shown in FIGS. 3G and 4G can proceed in a manner that is generally opposite to the packaging process. For example, as just noted, the rolled region 204 can proceed by rolling the airbag cushion 204 toward the proximal end thereof. Because inflation gases are introduced into the airbag cushion 204 at the proximal end, the airbag cushion 204 can unroll toward the distal end. For a given portion of the lateral regions 262, 264, the portion of the airbag cushion 204 that forms the lateral regions 262, 264 can unroll before unfolding. In further embodiments, the more proximal portions of the lateral regions 262, 264 can unfold, or begin to unfold, as more distal regions portions of the lateral regions 262, 264 are unrolling.

In other folding or packaging methods, some of the stages just described can be performed in orders other than those shown in the sequence of FIGS. 2A-2G. For example, in some embodiments, the arrangement shown in FIG. 2A is coupled with the housing 202 at any suitable stage, such as an initial stage. The rolled region 230 is formed in an early stage by rolling the flattened airbag cushion 204 toward the housing until it reaches the position shown in FIG. 2F. In particular, the rolled region 230 is formed before the lateral regions 262, 264 are accordion folded. Accordingly, after it has been formed, the rolled region 230 extends laterally outwardly beyond the lateral sides 253, 255 of the housing 202. At this point, the lateral regions 262, 264 (which are already in the rolled region 230), can be folded inwardly toward the central longitudinal axis LONG (e.g., in a manner similar to that shown in FIG. 2B, but performed on the rolled region 230), which can allow a lateral width of the airbag cushion 204 to fit within the lateral extent of the housing 202. In further embodiments, the lateral regions 262, 264 can be folded again outwardly from the central longitudinal axis LONG, and lateral edges of the lateral regions 262, 264 may be aligned with the first, or outward, folds of the lateral regions 262, 264 (e.g., in a manner similar to that shown in FIG. 2C, but performed on the rolled region 230).

The assembly 200 may thereafter be arranged in the completed or packaged state of FIG. 2G. The final arrangement can include a deployment accordion fold, such as either of those shown in FIGS. 3A and 4A. Transition of an airbag cushion from the packaged state, such as that shown in FIG. 2G, to the deployed state, such as that shown in FIGS. 3G and 4G can proceed in a manner that is generally opposite to this further packaging process. For example, as just noted, the rolled region 204 can proceed by rolling the airbag cushion 204 toward the proximal end thereof. Because inflation gases are introduced into the airbag cushion 204 at the proximal end, the airbag cushion 204 can unroll toward the distal end. The folded lateral regions 262, 264 may unfold prior to the unrolling of the rolled region 230.

FIGS. 3A-3G depict another embodiment of an inflatable cushion airbag assembly 300 that can resemble the airbag assemblies 100, 200 described above in certain respects. Accordingly, like features are designated with like reference numerals, with the leading digits incremented to "3." Relevant disclosure set forth above regarding similarly identified features thus may not be repeated hereafter. Moreover, specific features of the airbag assembly 300 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 300. Any suitable combination of the features and variations of the same described with respect to the airbag assemblies 100, 200 can be employed with the airbag assembly 300, and vice versa.

The airbag assembly 300 includes a housing 302 having an upper wall 314 and having a cover 320 that is pivotally attached to a front wall 312 thereof. The housing 302 defines a deployment opening 318. The assembly 300 further includes an airbag cushion 304 that includes a rolled region 330 and a deployment accordion fold 334. The deployment accordion fold 334 is positioned between the cover 320 and the rolled region 330. The deployment accordion fold 334 is defined by two layers 392, 394 of the airbag cushion 304 that meet at an apex 396. In the illustrated embodiment, the apex 396 is at a rearward end of the housing 302 and is adjacent to the end of the cover 320 that is opposite the pivoting end. Accordingly, the apex 396 region of the airbag cushion 304 can readily assist in opening the cover 320 during deployment.

An exit path 390 extends from at least a portion of the accordion fold 334 to the deployment opening 318. The deployment path 390 is unobstructed when the airbag is in the packaged state. For example, as can be seen by comparing FIGS. 3A and 3B, no portion of the accordion fold 334 pushes the rolled region 330 or passes along a path previously followed by the rolled region 330 prior to exiting the housing 330. Indeed, the accordion fold 334 exits the housing 302 before the rolled region 330 does. The exit path 390 may be narrower or wider than the depiction in FIGS. 3A and 3B.

Due to the positioning of the accordion fold 334 between the cover 320 and the upper wall 314, the upper wall 314 can act as a reaction surface against which the rolled region 330 is pressed during initial stages of deployment. As inflation gases enter the proximal region of the airbag cushion so as to fill the deployment accordion fold 334, The rolled region 330 is compressed against the upper wall 314, and the reactionary force of the wall 314 and the rolled region 330 causes the accordion fold 334 to exit the housing 302. As can be seen from FIGS. 3C-3G, such an initial deployment, in which the rolled region 330 is generally at rest, allows the proximal portion of the airbag to exit into position initially, and allows the rolled region 330 to follow with a much smaller downward momentum than it would have if the accordion fold 334 were instead initially positioned between the rolled region 330 and the upper wall 314. This can yield the desirable trajectory illustrated in these figures.

In certain embodiments, such an arrangement and deployment configuration can permit a much smaller mass of cushion to contact an occupant initially, which can reduce the initial deployment force on the occupant. The reduced force can reduce the potential for out-of-position (OOP) injuries. Additionally, arrangements in which the cover opens downwardly can also provide a low risk to OOP occupants. As can be seen in FIGS. 3C-3G, the rolled region 330 of the airbag cushion is progressively filled with inflation gases that move in a generally upward direction, which can provide a desirable trajectory that does not aggressively contact an occupant's legs.

FIGS. 4A-4G depict another embodiment of an inflatable cushion airbag assembly 400 that can resemble the airbag assemblies 100, 200, 300 described above in certain respects. Accordingly, like features are designated with like reference numerals, with the leading digits incremented to "4." Relevant disclosure set forth above regarding similarly identified features thus may not be repeated hereafter. Moreover, specific features of the airbag assembly 400 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 400. Any suitable combination of the features and variations of the same described with respect to the airbag assemblies 100, 200, 300 can be employed with the airbag assembly 400, and vice versa.

The airbag assembly 400 includes a housing 402 having a rear wall 410 and having a cover 420 that is pivotally attached to a front wall 412 thereof. The housing 402 defines a deployment opening 418. The assembly 400 further includes an airbag cushion 404 that includes a rolled region 430 and a deployment accordion fold 434. The deployment accordion fold 434 is positioned between an inflator 406 and the rolled region 430. The rolled region 430 is positioned between the accordion fold 434 and the rear wall 410. The deployment accordion fold 434 is defined by two layers 492, 494 of the airbag cushion 404 that meet at an apex 496. In the illustrated embodiment, the apex 496 is at an upper end of the housing 402.

An exit path 490 extends from at least a portion of the accordion fold 434 to the deployment opening 418. The deployment path 490 is unobstructed when the airbag is in the packaged state. For example, as can be seen by comparing FIGS. 4A and 4B, no portion of the accordion fold 434 pushes the rolled region 430 or passes along a path previously followed by the rolled region 430 prior to exiting the housing 430. Indeed, the accordion fold 434 exits the housing 402 before the rolled region 430 does. The exit path 490 may be narrower or wider than the depiction in FIGS. 4A and 4B.

Due to the positioning of the rolled region 430 between the cover 420 and the rear wall 410, the rear wall 410 can act as a reaction surface against which the rolled region 430 is pressed during initial stages of deployment. As inflation gases enter the proximal region of the airbag cushion so as to fill the deployment accordion fold 434, The rolled region 430 is compressed against the rear wall 410. The reactionary forces the rear wall 410 and the rolled region 430 at the rearward side of the accordion fold 434 and the reactionary force of the inflator 406 at the forward side of the accordion fold 434 cause the accordion fold 434 to move downward so as to exit the housing 402. As can be seen from FIGS. 4C-4G, such an initial deployment, in which the rolled region 430 is generally at rest, allows the proximal portion of the airbag to exit into position initially, and allows the rolled region 430 to follow with a much smaller downward momentum than it would have if the accordion fold 434 were instead initially positioned so as to push the rolled region 430 from the housing 402. This can yield the desirable trajectory illustrated in these figures.

Figure 5A:
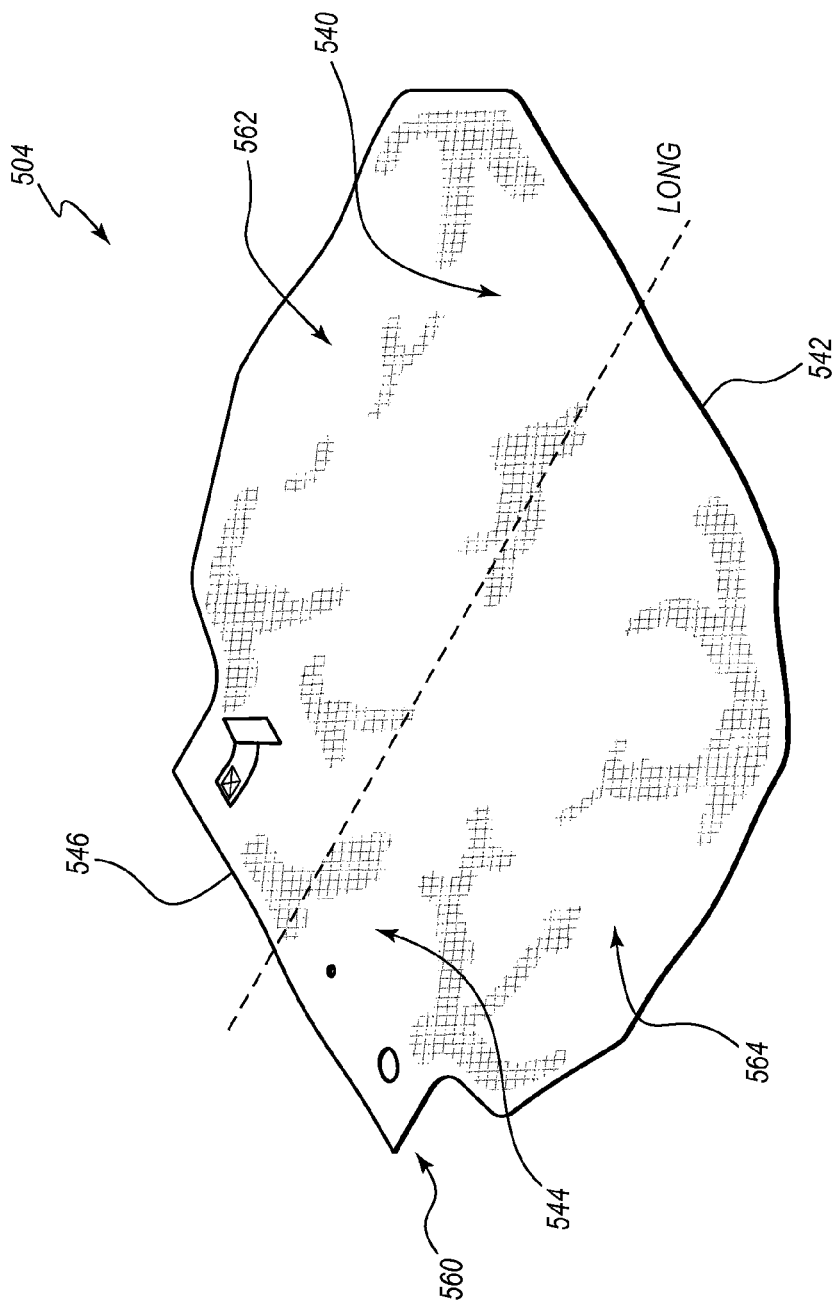
FIGS. 5A-5C are perspective views of another illustrative procedure for assembling an embodiment of an airbag assembly.
Figure 5B:
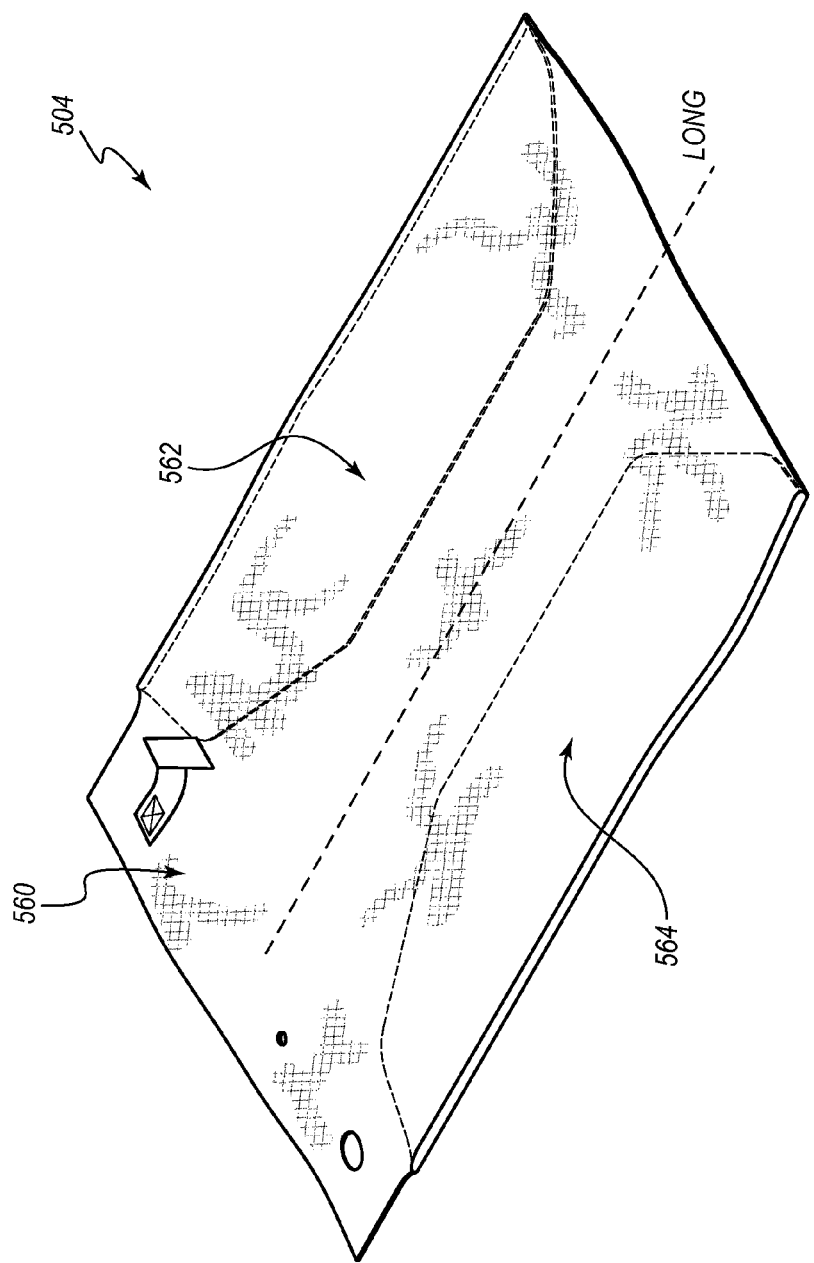
Figure 5C:
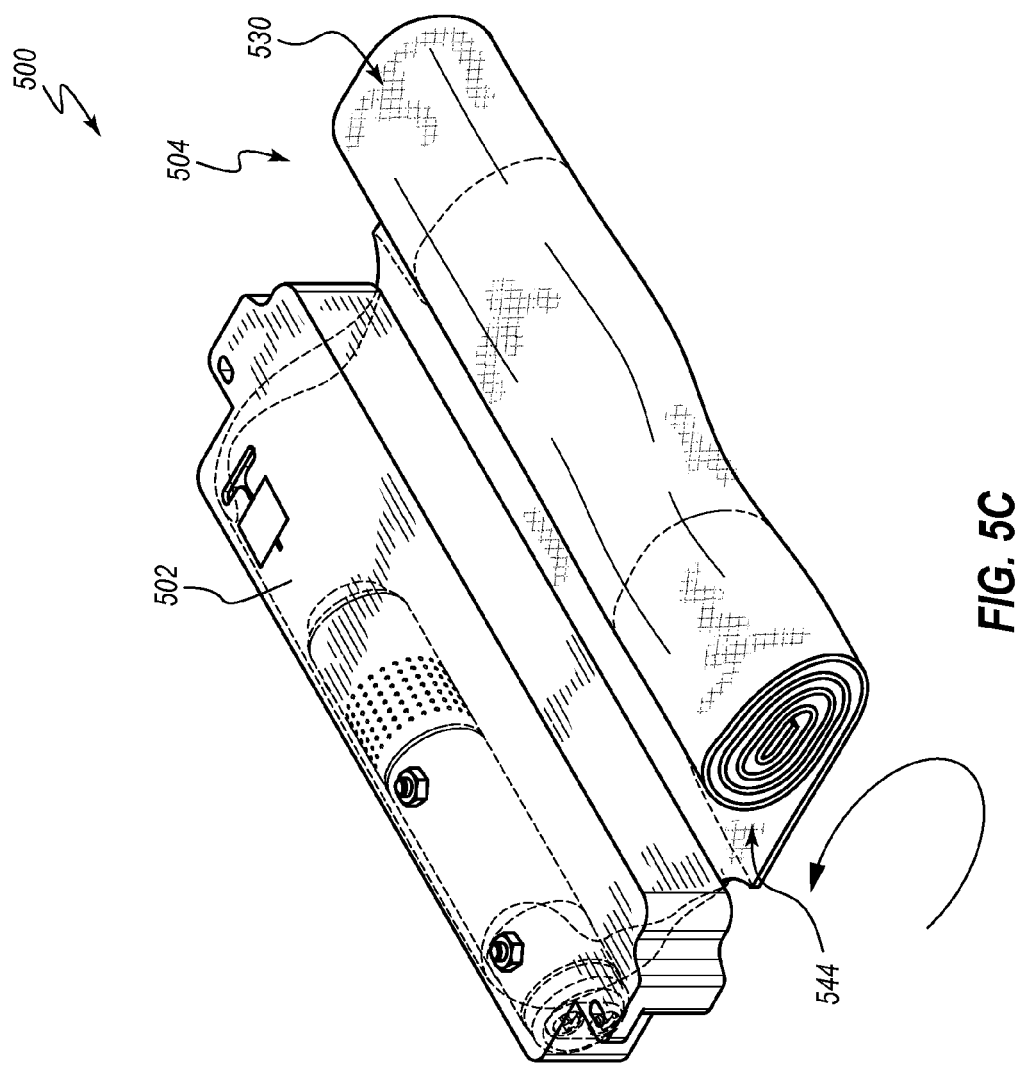

FIGS. 5A-5C depict another embodiment of an inflatable cushion airbag assembly 500 that can resemble the airbag assemblies 100, 200, 300, 400 described above in certain respects. Accordingly, like features are designated with like reference numerals, with the leading digits incremented to "5." Relevant disclosure set forth above regarding similarly identified features thus may not be repeated hereafter. Moreover, specific features of the airbag assembly 500 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 500. Any suitable combination of the features and variations of the same described with respect to the airbag assemblies 100, 200, 300, 400 can be employed with the airbag assembly 500, and vice versa.

FIGS. 5A-5C further depict another illustrative packaging sequence for an airbag cushion 504. The airbag cushion 504 can be coupled with a housing 502 to form the assembly 500. Accordingly, the drawings may also be said to depict an illustrative method for packaging or assembling the assembly 500. The airbag cushion 504 can include a distal region 540 having a distal edge 542, a proximal region 544 that defines a throat 560 and two lateral regions 562, 564.

The procedure for packaging the cushion 504 can be similar to that discussed above with respect to packaging the cushion 204 in FIGS. 2A-2G. For example, as shown in FIG. 5A, the airbag cushion 504 may initially be in a flattened state, such as that of FIG. 2A. However, as shown in FIG. 5B, rather than being accordion folded (compare FIG. 5B with FIGS. 2B and 2C), the lateral regions 562, 564 are tucked into an interior of the airbag cushion 504. Stated otherwise, the lateral edges are pushed toward a central longitudinal axis LONG such that the lateral regions 562, 564 are inverted and are positioned at an interior of the airbag cushion 504. Each lateral region 562 may thus have an outermost edge that is substantially aligned with a lateral edge of the throat 560, such that the tucked airbag cushion 504 defines a lateral width that is substantially the same as the lateral width of the throat 560.

As shown in FIG. 5C, the distal region 540 can be rolled toward the housing 502 so as to define a rolled region 530. An deployment accordion fold can be formed in the proximal region 544 in any suitable manner, such as discussed above, so as to finalize packaging of the airbag cushion 504 within the housing 502 (see FIGS. 2G, 3A, 4A).

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the disclosure is therefore defined by the following claims.

The invention claimed is:

1. An airbag assembly comprising:
   a housing defining a cavity and a deployment opening, wherein the housing comprises a wall that defines at least a portion of the cavity;
   an inflator; and
   an airbag cushion comprising a proximal portion and a distal end, wherein the proximal portion of the airbag cushion is coupled with the inflator such that an interior of the airbag cushion is in fluid communication with a portion of the inflator from which inflation gases are configured to be released,
   wherein the airbag cushion is in a packaged configuration within the cavity of the housing and comprises a deployment accordion fold and a rolled region, wherein the deployment accordion fold is defined by at least a portion of the proximal portion of the airbag cushion, wherein the accordion fold is upstream from the rolled region such that inflation gases from the inflator must pass through the portion of the airbag cushion that defines the accordion fold before they can enter the rolled region, and wherein the distal end of the airbag cushion is at an interior of the rolled region,
   wherein the rolled region of the airbag cushion is adjacent to the wall of the housing and is positioned between the wall of the housing and the deployment accordion fold prior to deployment of the airbag cushion, and
   wherein the wall of the housing is configured to act as a reaction surface during deployment of the airbag cushion such that:
      the deployment accordion fold presses the rolled region of the airbag cushion against the wall of the housing and maintains the rolled region in contact with the wall of the housing and generally at rest relative to the housing as the deployment accordion fold fills with inflation gases;
      at least a portion of the accordion fold exits the housing through the deployment opening before the rolled region exits the housing; and
      the rolled region is pulled, via the portion of the airbag cushion that defines the accordion fold, outwardly from the housing and out of said contact with the wall of the housing.

2. The airbag assembly of claim 1, wherein, when the housing is mounted in a vehicle such that the deployment opening faces downward, the wall of the housing imparts no downward momentum to the rolled region as the rolled region exits the housing.

3. The airbag assembly of claim 1, wherein the housing further comprises an additional wall that is perpendicular to the wall that is configured to act as the reaction surface during deployment of the airbag cushion.

4. The airbag assembly of claim 3, wherein the wall that is configured to act as the reaction surface is adjacent to the deployment opening and wherein the additional wall and the deployment opening are at opposite sides of the housing.

5. The airbag assembly of claim 3, wherein the additional wall is adjacent to the deployment opening and wherein the deployment opening and the wall that is configured to act as the reaction surface are at opposite sides of the housing.

6. The airbag assembly of claim 1, wherein the housing defines a generally parallelepiped configuration.

7. The airbag assembly of claim 1, wherein, when the housing is mounted in a vehicle such that the deployment opening faces downward, the general direction of the momentum of the rolled region once it has exited the housing is generally horizontal.

8. The airbag assembly of claim 1, wherein the housing is configured to be installed in a vehicle such that the deployment opening is at a lower end thereof, wherein the deployment accordion fold is configured to expand downwardly through the deployment opening during initial inflation of the airbag cushion, and wherein the rolled region of the airbag cushion is configured to be pulled from the housing and unrolled in each of a rearward direction toward a vehicle occupant position and an upward direction during further inflation of the airbag cushion.

9. The airbag assembly of claim 1, wherein the wall and the deployment opening are at opposite sides of the housing such that the accordion fold is closer to the deployment opening than is the rolled region when the airbag cushion is in the packaged configuration.

10. The airbag assembly of claim 9, wherein the housing is configured to be installed within a vehicle such that the wall is at an upper side of the housing and the deployment opening is at a lower end of the housing.

11. The airbag assembly of claim 1, wherein the deployment accordion fold is positioned between the inflator and the rolled region of the airbag cushion.

12. The airbag assembly of claim 1, wherein the airbag cushion comprises lateral regions that are configured to expand at opposite sides of the airbag cushion so as to extend in a cross-vehicle direction when the airbag cushion is deployed, wherein each lateral region is in an accordion folded arrangement that is rolled within the rolled region of the airbag cushion when the airbag cushion is in the packaged configuration, and wherein a transverse width of the rolled region is about the same as a transverse width of the housing.

13. The airbag assembly of claim 1, wherein the housing is configured to be installed in a vehicle such that the wall of the housing is a rear wall that is positioned closest to a vehicle occupant position when the housing is installed in a vehicle, and wherein the deployment opening is at a lower end of the housing.

14. The airbag assembly of claim 1, wherein the deployment accordion fold comprises a first and a second layer of the airbag cushion that are folded relative to each other so as to meet at an apex, and wherein the apex is further from the deployment opening than is any other portion of either of the first and second layers of the deployment accordion fold.

15. The airbag assembly of claim 1, wherein the airbag cushion comprises lateral regions that are configured to expand at opposite sides of the airbag cushion so as to extend in a cross-vehicle direction when the airbag cushion is deployed, and wherein at least a portion of each lateral region is in an accordion folded arrangement that is rolled within the rolled region of the airbag cushion when the airbag cushion is in the packaged configuration.

16. The airbag assembly of claim 1, wherein the airbag cushion comprises lateral regions that are configured to expand at opposite sides of the airbag cushion so as to extend in a cross-vehicle direction when the airbag cushion is deployed, and wherein at least a portion of each lateral region is in tucked arrangement that is rolled within the rolled region of the airbag cushion when the airbag cushion is in the packaged configuration.

17. An airbag assembly comprising:
a housing defining a cavity and a deployment opening;
an inflator; and
an airbag cushion comprising a proximal portion and a distal portion, wherein the proximal portion of the airbag cushion is coupled with the inflator such that an interior of the airbag cushion is in fluid communication with a portion of the inflator from which inflation gases are configured to be released,
wherein the airbag cushion is in a packaged configuration within the cavity of the housing and comprises a deployment accordion fold and a rolled region, wherein the deployment accordion fold is defined by at least a portion of the proximal portion of the airbag cushion, wherein the rolled region comprises at least a portion of the distal portion of the airbag cushion, and wherein the deployment accordion fold is upstream from the rolled region such that inflation gases from the inflator must pass through the portion of the airbag cushion that defines the deployment accordion fold before they can enter the rolled region,
wherein the deployment accordion fold is configured to interact with the rolled region and the rolled region is configured to interact with the housing such that, upon inflation of the airbag cushion via the inflator, the deployment accordion fold expands and exits the housing without pushing the rolled region through the deployment opening, and
wherein the portion of the airbag cushion that defines the deployment accordion fold is configured to pull the rolled region outwardly from the housing after said portion has exited the housing.

18. The airbag assembly of claim 17, wherein pushing forces imparted to the rolled region by the deployment accordion fold during deployment of the airbag cushion are counteracted by the housing to maintain the rolled region generally at rest relative to the housing.

19. The airbag assembly of claim 17, wherein the housing comprises an upper wall and a rear wall that are perpendicular to each other, and wherein the deployment accordion fold is configured to compress the rolled region against one of the upper wall and the rear wall to cause the rolled region to remain generally at rest relative to the housing prior to a time that the portion of the airbag cushion that defines the deployment accordion fold pulls the rolled region outwardly from the housing.

20. The airbag assembly of claim 17, wherein at least a portion of the deployment accordion fold is positioned between the rolled region of the airbag cushion and the opening of the housing.

21. The airbag assembly of claim 17, wherein at least a portion of the deployment accordion fold is positioned between the inflator and the rolled region of the airbag cushion.

22. The airbag assembly of claim 17, wherein the airbag cushion comprises lateral regions that are configured to expand in opposite lateral directions so as to extend in a cross-vehicle direction when the airbag cushion is deployed, and wherein at least a portion of the lateral regions are in an accordion folded arrangement that is rolled within the rolled region of the airbag cushion when the airbag cushion is in the packaged configuration.

23. A method of packaging an airbag assembly, the method comprising:

coupling an inflator with a housing that defines a cavity and a deployment opening;

coupling a proximal portion of an airbag cushion with the inflator, wherein the airbag cushion comprises a distal portion that extends from the proximal portion;

rolling the distal portion of the airbag cushion so as to form a rolled region of the airbag cushion;

folding at least a portion of the proximal portion of the airbag cushion so as to form a deployment accordion fold, wherein the deployment accordion fold is upstream from the rolled region such that inflation gases from the inflator must pass through the portion of the airbag cushion that defines the accordion fold before entering the rolled region; and positioning the airbag cushion within the cavity of the housing with the rolled region adjacent to a wall of the housing such that:

the deployment accordion fold is configured to interact with the rolled region and the rolled region is configured to interact with the wall of the housing, upon inflation of the airbag cushion via the inflator, to permit the accordion fold to expand and exit the housing without pushing the rolled region through the deployment opening; and the portion of the airbag cushion that defines the deployment accordion fold is configured to pull the rolled region outwardly from the housing after said portion has exited the housing.

24. The method of claim 23, wherein the method further comprises positioning the rolled region of the airbag cushion between the wall of the housing and the deployment accordion fold.

* * * * *

UNITED STATES PATENT AND TRADEMARK OFFICE
CERTIFICATE OF CORRECTION

| | | |
|---|---|---|
| PATENT NO. | : 8,540,276 B2 | Page 1 of 1 |
| APPLICATION NO. | : 13/290856 | |
| DATED | : September 24, 2013 | |
| INVENTOR(S) | : David W. Schneider and John F. Witt, Jr. | |

It is certified that error appears in the above-identified patent and that said Letters Patent is hereby corrected as shown below:

Title page, item (75) inventor: should read as follows:

"John F. Whitt, Jr." should be replaced by --John F. Witt, Jr.--

Signed and Sealed this
Nineteenth Day of November, 2013

Teresa Stanek Rea
*Deputy Director of the United States Patent and Trademark Office*